United States Patent
Decoste et al.

(10) Patent No.: US 6,317,142 B1
(45) Date of Patent: *Nov. 13, 2001

(54) TAXONOMY OF OBJECTS AND A SYSTEM OF NON-MODAL PROPERTY INSPECTORS

(75) Inventors: Marc-Andre Decoste; Daniel Desbois; Marc Hebert; Thomas Krul; Nicholas Michaud, all of Montreal; A. Michael Mondry, Nuns' Island; Michael C. Sheasby, Longueuil, all of (CA); Luis Talavera, Mexico City (MX)

(73) Assignee: Avid Technology, Inc., Tewksbury, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,479

(22) Filed: Apr. 3, 1998

Related U.S. Application Data

(63) Continuation-in-part of application No. 08/872,902, filed on Jun. 11, 1997, now Pat. No. 5,999,190.
(60) Provisional application No. 60/042,936, filed on Apr. 4, 1997.

(30) Foreign Application Priority Data

Apr. 19, 1997 (CA) .................................................. 2202722

(51) Int. Cl.⁷ ....................................................... G06F 15/00
(52) U.S. Cl. ........................... 345/762; 345/431; 345/764
(58) Field of Search .................................... 345/331, 333, 345/334, 339, 349, 347, 353, 354, 356, 751, 762, 765, 764, 839, 808, 841, 840, 853, 430, 431

(56) References Cited

U.S. PATENT DOCUMENTS

| | | | |
|---|---|---|---|
| 5,361,349 | * 11/1994 | Sugita et al. | 345/333 |
| 5,644,740 | * 7/1997 | Kiuchi | 345/357 |
| 5,706,457 | * 1/1998 | Dwyer et al. | 345/349 |
| 5,844,554 | * 12/1998 | Geller et al. | 345/333 |
| 5,999,190 | * 12/1999 | Sheasby et al. | 345/431 |
| 6,035,330 | * 3/2000 | Astiz | 709/218 |
| 6,115,043 | * 9/2000 | Levine | 345/350 |

* cited by examiner

Primary Examiner—Cao H. Nguyen
(74) Attorney, Agent, or Firm—Peter J. Gordon

(57) ABSTRACT

A system has a hierarchical organization for modifying and applying tools for manipulating data types. The system has a user interface for displaying the hierarchical organization, an inspector for viewing and modifying an internal structure of the tools and a button for launching each of the inspectors.

40 Claims, 14 Drawing Sheets

TAXONOMY OF OBJECTS AND A SYSTEM OF NON-MODAL PROPERTY INSPECTORS

RELATED APPLICATIONS

The present invention is a continuation-in-part of patent application, having ser. No. 08/872,902 now filed Jun. 11, 1997, now U.S. Pat. No. 5,999,190 which has a common inventor and a common assignee, which claims benefit of Prov. No. 60/042,936 filed Apr. 4, 1997.

FIELD OF THE INVENTION

The present invention relates to a method and system for manipulating standardising information of object types for a plug-in environment and providing a standardised set of tools optimised for the data type of the standardised information.

BACKGROUND OF THE INVENTION

Computer software is routinely used to create and/or modify graphic images on a computer display. Graphics software that is meant to run in conjunction with a graphical user interface-based operating system, such as Microsoft Windows NT, must be able to make use of the graphics capabilities of the operating system, i.e. the software must understand about brushes, pens, colors etc. Special graphics processors and higher speed general purpose processors used in conjunction with graphics software and large, high resolution monitors have improved the ability to display graphics and text images on a computer screen.

Graphics software packages are commercially available from a number of software vendors that run on various hardware configurations. The availability of reduced cost, more powerful processors has allowed paint and 3-D modelling systems to be made available for use on personal computers and high-speed workstations. A typical use of such software running on such a configuration of hardware is for video editing and computer animation.

Prior art graphics software is commercially available from SOFTIMAGE of Montreal, Canada. This software includes a paint capability wherein the user can define a brush that will be used in rendering images on the computer display. As with most computer graphics programs, existing graphics computer programs can also display text using a particular style of text where the style includes the font of the text as well as the size, color etc.

In the film, tension and multimedia industry, post production is normally carried out using several different editing and mixing equipment and facilities, including different computer-based animation and editing systems. Post production usually involves a wide range of processes on a wide range of data types, each of which can be affected or composed of a number of elements and/or properties. These data types, elements and properties vary greatly between toolsets. For example, audio data can receive audio effects, which deal with time and audio samples. In contrast, a body of text in a titling system can be assigned a font and channel mask, which ignores time and deals with a static image.

Simply describing the diversity of data types using a common language is a problem. As a result, graphics software such as prior art post production systems could not deal with such a variety of data types with a consistent user interface (UI). Separate systems and equipment were commonly used to handle the different data types.

Even if a suitable scheme (or taxonomy) for dealing with each of the various data types is developed, maintaining user interface consistency when dealing with these types remains a challenge. Ideally, the user interface should be consistent for all data and elements, efficient for use by very skilled "power" users, and extensible to handle new data types as the product and/or needs evolve.

These problems and needs apply to a wide variety of systems, including video post production systems and other complex environments and, as mentioned above, conventional user interfaces for such systems are often not fast enough for most power users. Specifically, a user often requires the ability to quickly select from a broad palette elements which include tools, properties and other settings. For instance if a user is animating a character, certain paint attributes which recreate objects such as hair, skin, etc., will be used repetitively. It is unacceptable to many users to be required to repeatedly make multiple selections, usually by multiple key presses mouse events, each time a tool or setting is to be accessed or employed.

Further, when using prior art graphics software and similar systems, it was not possible to easily save all the properties that are combined to define items such as brush strokes, text rendering or the like. For example, in order to produce a stroke or character with a particular or specific look, a paint or titling artist or other user can set up many individual parameters to achieve the desired result. For example, the user can define a specific brush shape, size, profile, specific color, opacity, tool shape etc. Once the properties for a parameter or tool have been set up, prior art software only allowed the user to save and retrieve some subsets of the discrete settings or parameters which were combined to achieve the desired result and thus the user would have to recreate the balance of the combination as best they could. Further, while some prior art graphics software does allow a user to save a brush by itself, or to create and save some combinations of parameters for very specific effects, none have allowed the user to save all the elements which uniquely define the appearance of each stroke, text element or other item.

SUMMARY OF THE INVENTION

It is an object of the present invention to provide a novel system and method of arranging and employing elements which are defined for a variety of data types which obviates or mitigates at least some of the disadvantages of the prior art.

In particular, the disadvantages of the prior art can be overcome by providing a system and method having a hierarchical organization of elements for creating and modifying data of various types. The system and method include: a set of "inspectors", which are presented to the user in windows within a user interface (LM to view and modify the internal structure of each of the elements known to the system; a UI component used to visualize the overall hierarchical structure of elements and to launch inspectors; and a mechanism for loading and saving persisted collections of elements, known as "presets".

According to one aspect of the invention, there is provided a system having one or more objects which can be of different types and which have a hierarchical organization of attributes. Depending on the type of object in question, this hierarchy of attributes is arranged to collect useful groups of parameters, known as "property sets". Each property set can be persisted or replaced by another collection of parameters.

A user interface is responsive to user input for displaying the hierarchical organization of the object and a launcher is responsive to user input for launching an inspector. An inspector is a non-modal window in a graphical user interface that displays settings of a selected attribute of the object and, responsive to user input, allows the settings to be modified.

According to another aspect of the invention, there is provided a method for adapting an object for a plug in environment. The method includes the steps of:

organizng the object into a hierarchical organization of attributes, providing a means for displaying the hierarchical organization of the object, providing a launch means responsive to user input for launching an inspector, providing means for displaying settings of a selected attribute of the object, and providing means responsive to user input for modifying the settings.

The present invention also concerns a method and apparatus for rendering images on a computer display. Imaging properties that can be stored in memory form part of an imaging tool. The imaging properties are made up of multiple families and classes that can be stored as a unit or in some instances stored individually. The properties can also be retrieved from memory and modified, used to render images and stored as a newly defined custom property.

In accordance with one aspect of the present invention, an imaging property is created by prompting a user to define a plurality of attributes that combine to define the property. When this property is associated with a particular object such as a drawing tool or a text tool, the properties helps defines how the associated brush stroke or text character is rendered or painted on the computer display. As a specific example, one of the properties is the style of the image rendering tool. When a drawing tool to being used, the style is referred to as a paint style and is made up of one set of properties and subcomponents. When text is being defined, the style is referred to as a titling style and includes a different set of properties and subcomponents The settings for a plurality of custom or preset styles can be stored within a memory store such as a computer fixed disk drive. Under the control of the user, the stored attributes for a designated preset are retrieved from memory in order to replace some or all of the attributes currently associated with a graphics rendering object or tool. Subsequent use of the tool is controlled, at least in part, by the attributes of the style preset.

An additional feature of the present invention is an ability to select an object on an image portion of the display screen and display at least some of the attributes that make up the property set of the selected object. If a text body is selected, the attributes are composed at least in part by a titling style; if a brush stroke is selected, the attributes are composed at least in part by a paint style. The user can then modify the properties of the selected object for use in subsequent imaging on the computer display and also store the attributes of the style as a preset in long-term memory for subsequent retrieval.

To aid in interpreting the object, the invention includes the ability to display a graphic image of the object's hierarchy on a portion of the computer display. The object is represented on the computer display as a hierarchical structure wherein property sets are depicted as branches on a tree structure that in turn include subcomponent attributes. Arbitrary branches of a property tree can be saved as a unit, such as a custom style. This allows the branches to be retrieved from memory and grafted onto an existing graphics rendering tool.

In accordance with a preferred embodiment of the invention, the style preset, or any branch of the tree, is an object in the sense that term has come to be defined in object oriented programming. The style preset object has both methods and properties associated with it. The methods limit access to the properties of the style preset and define the behaviour of the preset.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
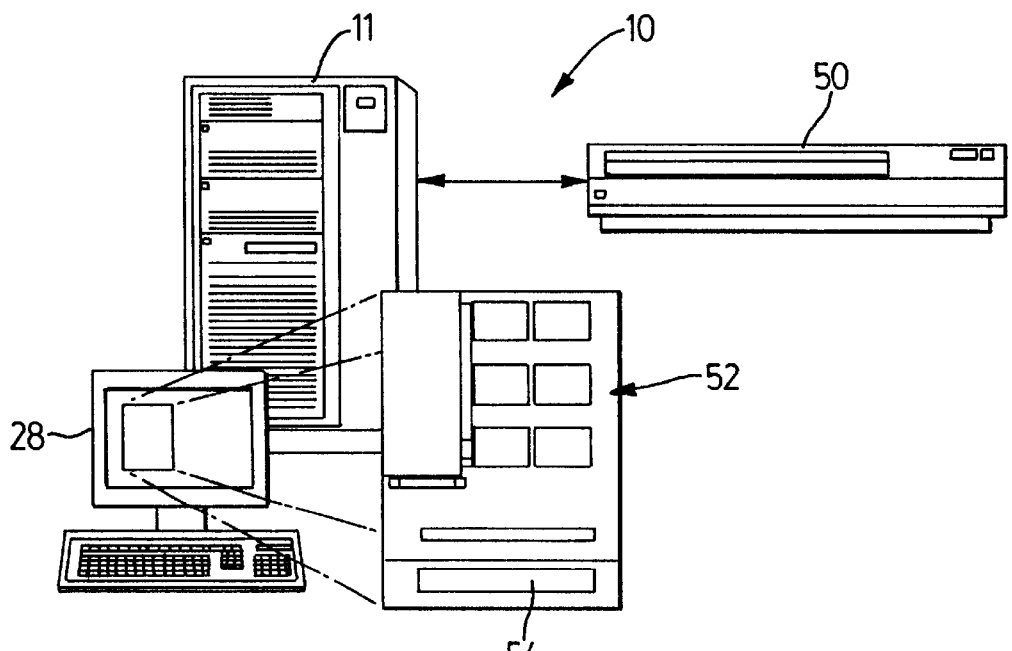
FIG. 1 is an overview of a computer system suitable for rendering display images in accordance with the present invention.
Figure 2:
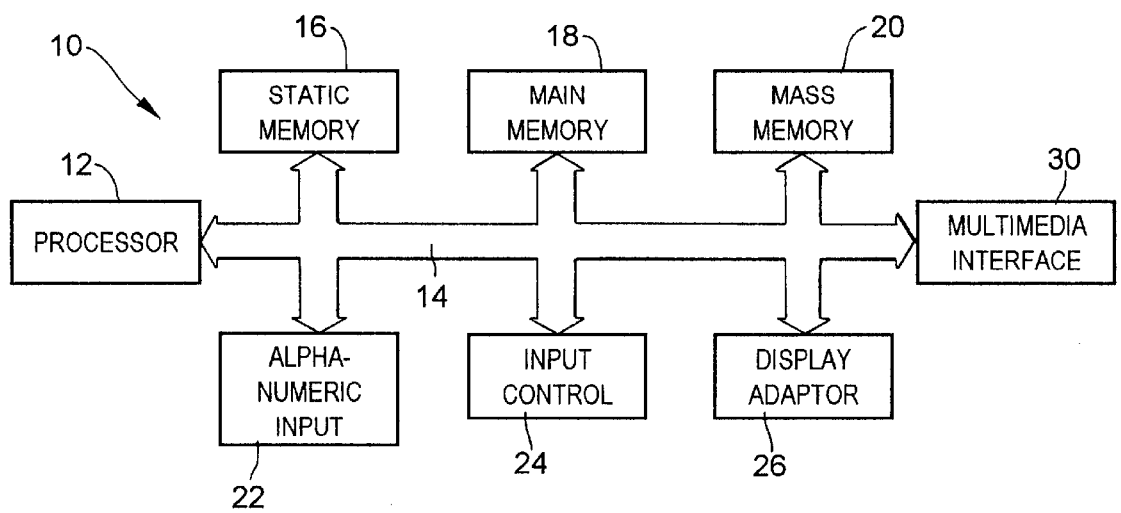
FIG. 2 is a schematic representation of the FIG. 1 computer system.

A computer graphics imaging system 10 is schematically depicted in FIGS. 1 and 2. The graphics imaging system 10 includes a computer 11 that has a processor 12, a system bus 14, a static memory 16, a main memory 18, a mass memory 20, an alphanumeric input device 22, a control device 24 for manipulating a cursor, and a display adapter 26 for coupling video control signals to a video display 28 such as a computer monitor. Since graphics imaging system 10 is particularly suited to high resolution, high speed graphics imaging the display or monitor 28 is most preferably a high resolution wide screen display.

Processor 12 executes imaging software described below to allow the system 10 to render high quality graphics images on the monitor 28. Processor 12 comprises a suitable processing device such as a microprocessor, for example, and may comprise a plurality of suitable processing devices. Processor 12 executes instructions stored in the static memory 16, main memory 18, and/or mass memory 20.

Static memory 16 can comprise read only memory (ROM) or any other suitable memory device. The static memory 16 may store, for example, a boot program for execution by the processor 12 to initialize the data processing system 10. Main memory 18 can comprise random access memory (RAM) or any other suitable memory device. The mass memory 20 may include a hard disk device, a floppy disk, an optical disk, a flash memory device, a file server device, or any other suitable memory device. As used herein, the term memory is intended to comprise a single memory device and/or any combination of suitable memory devices for the storage of data and instructions.

System bus 14 provides for the transfer of digital information between the hardware devices of the data processing system 10. Processor 12 also receives data over the system bus 14 that is input by a user through the alphanumeric input device 22 and/or the cursor control device 24. The alphanumeric input device 22 may comprise a keyboard, for example, that comprises alphanumeric keys. The alphanumeric input device 22 may comprise other suitable keys, comprising function keys for example. The cursor control device 24 may comprise a mouse, touch tablet, track-ball, and/or joystick, for example, for controlling the movement of a cursor displayed on the computer display 28.

As shown in FIG. 1, data processing system 10 also includes display adapter hardware 26 that can be implemented as a circuit that interfaces with the bus 14 for facilitating rendering of images on the computer display 28. The display adapter hardware 26 can, for example, be implemented with a special graphics processor printed circuit board including dedicated random access memory that helps speed the rendering of high resolution, color images on a viewing screen of the display 28.

The display 28 may comprise a cathode ray tube (CRT) or a liquid crystal display (LCD) particularly suited for displaying graphics on its viewing screen. The invention can be implemented using high speed graphics workstations as well as personal computers having one or more high speed processors.

The graphics imaging system 10 utilizes specialized graphics software particularly suited to take advantage of the display adapter hardware 26. In a present embodiment, the software integrates non-linear editing, compositing, audio mixing, and graphics design tools which are used to create multimedia presentations. Source material for use with such a system can be obtained from a media storage device 50 that can include videotape, CD-ROMs, and digitally recorded video disks. The source material can also be in the form of already digitized materials stored on a computer memory 20, such as computer-generated animations, graphic images or video files stored on a large capacity hard or fixed disk storage.

To utilize the source images from the media storage 50, the system 10 includes a multi-media interface 30 for converting image data into a form suitable for use by the software executing on the processor 12 and display adapter 26. A representative display produced by the graphics software (FIG. 1) presents multiple images 52 of different resolutions. A timeline control 54 beneath these multiple images allows the user to select from an video clip of many such images.

Figure 3:
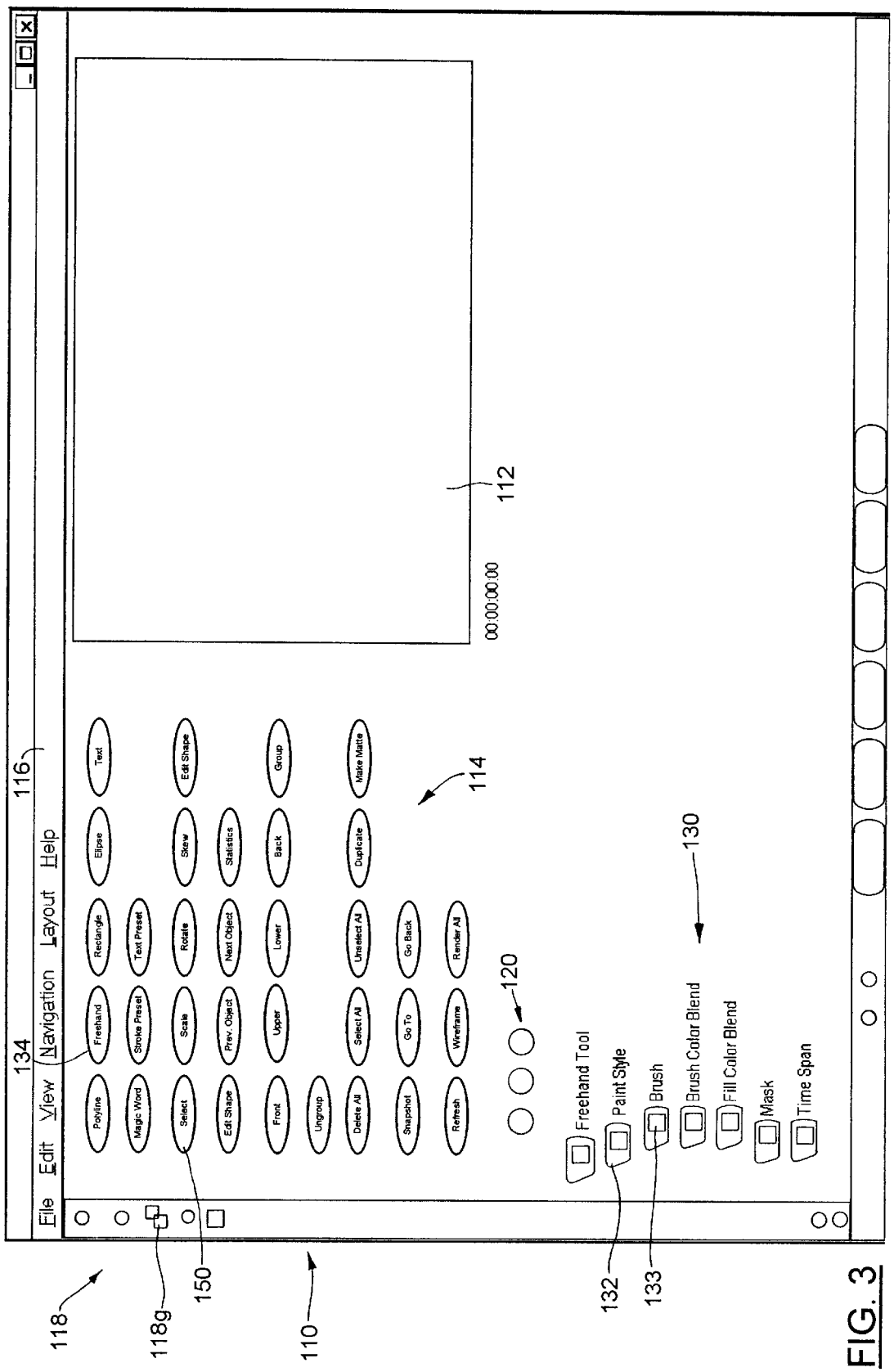
FIG. 3 is a visual representation of a computer display illustrating one display mode for use in presenting images.

FIG. 3 illustrates a typical user interface or screen display 110 for use in graphics imaging by a graphics design suite that forms part of the graphics software. The screen display 110 includes an image viewing area 112, a panel 114 which displays a series of layers that includes a number of buttons that are actuated by selecting or clicking on the respective button with the cursor control device 24. The graphics software is executed under an operating system with a graphical user interface, such as Microsoft Windows NT, that includes functions for creating a frame window having a menu bar 116. A taskbar 118 located along the side of the panel 114 allows the user to switch between tasks by activating or selecting icons representing different tasks. The graphic design suite having the user interface depicted in FIG. 3 is launched by selecting the graphics icon 118g from this set of icons. Others of the icons cause the software to display other user interface layouts particularly suited for other tasks such as editing, audio mixing, or combining multiple video layers into a combined output.

Below the 'panel' 114, a re-used section of the desktop, the display includes an array 120 of icons, called a 'control panel'. Selecting from among the icons presented in the control panel replaces the contents of the panel above it with an associated set of tools and controls, such as a representation of the layers available in a compositing session.

Below the viewing area 112 is an area reserved for the property inspectors, or property editors. As used herein, the term property inspector is intended to comprise a non-modal window in a UI for providing a collection of controls for the interactive manipulation of parameters associated with an existing object or with the settings of an active tool. An inspector is a floating window that exposes a set of parameters for the user to manipulate. The inspector can reflect two things: the parameters of a particular object instance and the "ambient" settings, described below, for a property set.

For example, a clip inspector reflects a particular clip selected on the timeline. An "ambient" setting for a attribute is something which will be used by an interactive tool to create new objects. As another example, a brush inspector can reflect either the brush that was used to draw the selected stroke, or the brush which will be used by the freehand tool the next time the user draws a new stroke.

Each inspector has a standard set of controls 66 which is independent of the particular family, a set of family specific controls 68 and a key frame control 70.

Figure 20:
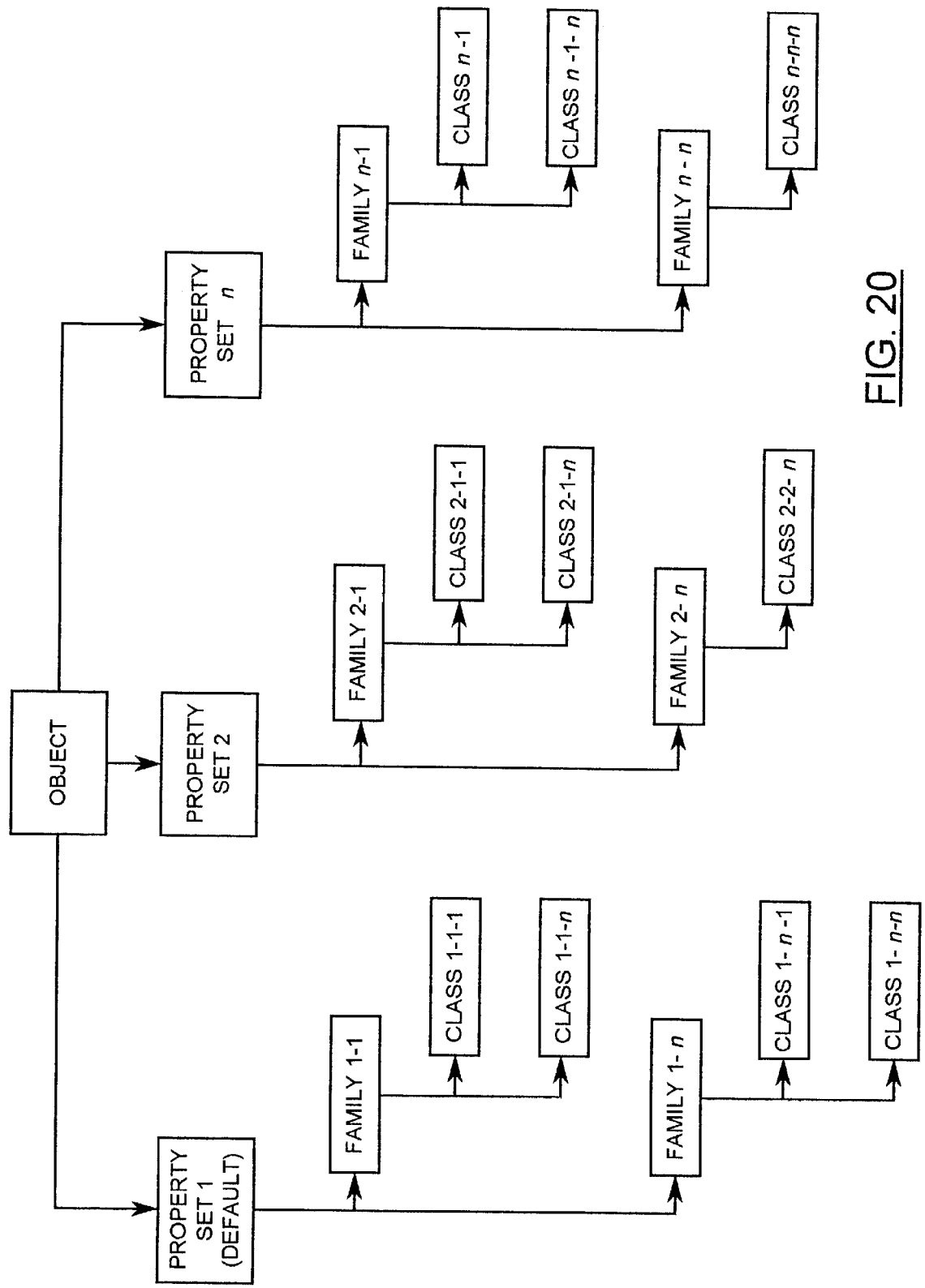
FIG. 20 is a schematic illustration of the generalised taxonomy of objects according to the present invention.

Referring to FIG. 20, a schematic of the generalised taxonomy of properties is illustrated. Within the taxonomy, an object is a self-contained collection of data structures and routines that interact with other objects. Every object can be said to support some set of properties. A set of properties is a collection of parameters which describe that object. Some objects are complex and have multiple sets of properties, while others are simple enough that they require only one property set.

For example, an image effect object can have one property set describing a blur amount, the affected channels, etc., while a paint stroke can have a number of sets of properties, each of which describes a property or set of properties about the stroke, such as: brush; fill effect; edge effect; timing; transformations; etc. Each property can contain one or more parameters. For example, a brush property can contain width, softness and/or other parameters. Properties can also contain more properties. For example, the brush effect used for a paint stroke might be a composite, or stack, of three effects, each of which has its own properties.

Each object maintains a prioritised list of its own properties. The default property is the first property in this list. The default property is inspected if the user makes a general request to inspect that object. For example, if the user right-clicks on an image effect applied to a clip in a timeline and chooses "properties", the default property for that object is opened. For the image effect, the property tree contains only a single node which will automatically be the default. For more complex objects having multiple nodes, such as paint strokes, the user can specify a default node.

Ambient properties are property sets which always exist and which the user can set prior to applying a tool. Some interactive tools are designed to create object instances which inherit the settings of the ambient properties at the time of creation. For example, a freehand draw tool can use an ambient brush and color property, amongst others. The user sets these ambient properties before drawing a stroke, The act of drawing creates stroke objects, each of which holds specific brush and color properties which were copied from the ambient settings as they were configured when the object was created.

Multiple interactive tools can share ambient properties. For example, the user can choose to paint in blue. Then, both the freehand and rectangle interactive tools will use this ambient property.

The taxonomy of property sets are organized into families and classes. A family is a group of objects which work on the same type of data and which share semantic meaning. Families comprise objects wherein each member of the family is interchangeable and equivalent to others of the family. Examples of families include the following: Blur/tint/color correction are members of the image effect family; and Reverb/Equalization/Compression are members of the audio effect family. Some families contain only one member: Fonts and Brushes are families that contain only one type of object and are considered to be degenerate.

A class is a specific type of object within a family. Examples of classes include Blur, Tint and Color correction, which are all classes of the image effect family. Schedule A provides an example of a list of families and their respective classes.

Each family is uniquely identified by a GUID (Globally Unique Identifier). Families are registered in a registry, which in a present embodiment of the invention is a Microsoft Windows NT registry. Use of such a registry allows additional families to be added at a later date. Objects can be registered as part of one or more families and objects can also specify a default or preferred family in the registry.

Each family is associated to a property inspector CLSID. A CLSID is a GUID representing a specific COM object, from the Microsoft Component Object Model. In this manner, given a class of a family, an appropriate property inspector can be created. For classes that are part of multiple families, the family's inspector can be specified. The inspector cannot be selected explicitly because the inspector would not know on which family to focus in case more than one family uses the same inspector.

The property tree view 130 is a visual display of the hierarchical properties of an object. It allows the user to see the internal structure of an object and allows some basic editing of the properties.

To allow the property tree view 130 access to the hierarchical organization of properties within an object, each object must expose an interface to enumerate its properties in a hierarchical way. This enumerator enables a user to query for the next property in the list, starting with the first one, by resetting the enumerator. For each property, the enumerator returns a structure of information including the type, the name, the thumbnail bitmap, the animation state and access to the children, if any.

Using the information resulting from this process, the object hierarchy can be reconstructed and presented to the user on the UI.

The user can interact with the hierarchy by clicking on nodes 133 to invoke an inspector on the part of the hierarchy that has been clicked on. For example, an object exposing a blur effect would have a specific node for this effect; clicking on that node would invoke a blur effect inspector to edit the settings of that effect.

The property tree view reacts to selection changes by exposing the property hierarchy of the currently selected objects. If there is no selected object, the state of the ambient parameters used by the current tool are shown instead. When a heterogeneous selection is made, the property tree view will try to find similarities between the selected objects and show them under a common node. The properties that are not exposed by all the selected objects are shown under different nodes, one for each different type of objects in the heterogeneous selection. If different objects expose the same property with different values, then the node is shown as ambiguous.

For example, if an object uses filter effects to draw edges, different filter effects could be utilized but both need to be represented as the edge filter effect property. Clicking on an ambiguous node cannot invoke an inspector so a file browser is opened to choose a common preset which will be used to replace the current ambiguous state of the property. Invoking a context menu on a node also allows the user to choose a preset to replace the current values of that property whether ambiguous or not. The menu lists presets found in the last folder used to load or save a preset for that class of objects. The last entry of the contextual menu allows the user to launch the file browser to choose other presets that are not visible in the contextual menu.

To solve the access to persistence from inspectors in a generic way, the inspector must know in which family context the inspected object is currently being used. Saving is not a problem since the object to persist itself at a location is chosen by the user. The class and family are employed as a "hint" on where to first focus when presenting the storage access.

Loading is relatively more difficult since the choice of persisted objects must be limited to a single family. There are two types of load that are possible: 1) load in a persisted preset of the same class as the currently inspected object or 2) load an object of a different class, but the same family, to replace the currently inspected object. For the former, the selected storage for the inspected object can be designated. For the latter, the owner or container of the inspected object must be queried to determine if it can replace the selected object with a new instance of another object and, if so, to create the object from the persisted state. To make sure the replacement can be done, the new object needs to be part of the same family as the family currently being inspected.

Since the behavior is uniform for all classes of the same family, the UI controls on the inspector frame can rely on the fact that all classes of this family expose the properties they control. For example, all image filters support the Crop Curve property so a Crop Curve UI control can be found on the inspector used by the Image filters family.

Any given inspector has a current family and class, and points to a specific instance or ambient property. The controls on an inspector's frame are determined by the family being represented, while the contents of the property pages are determine by the class.

Figure 4:
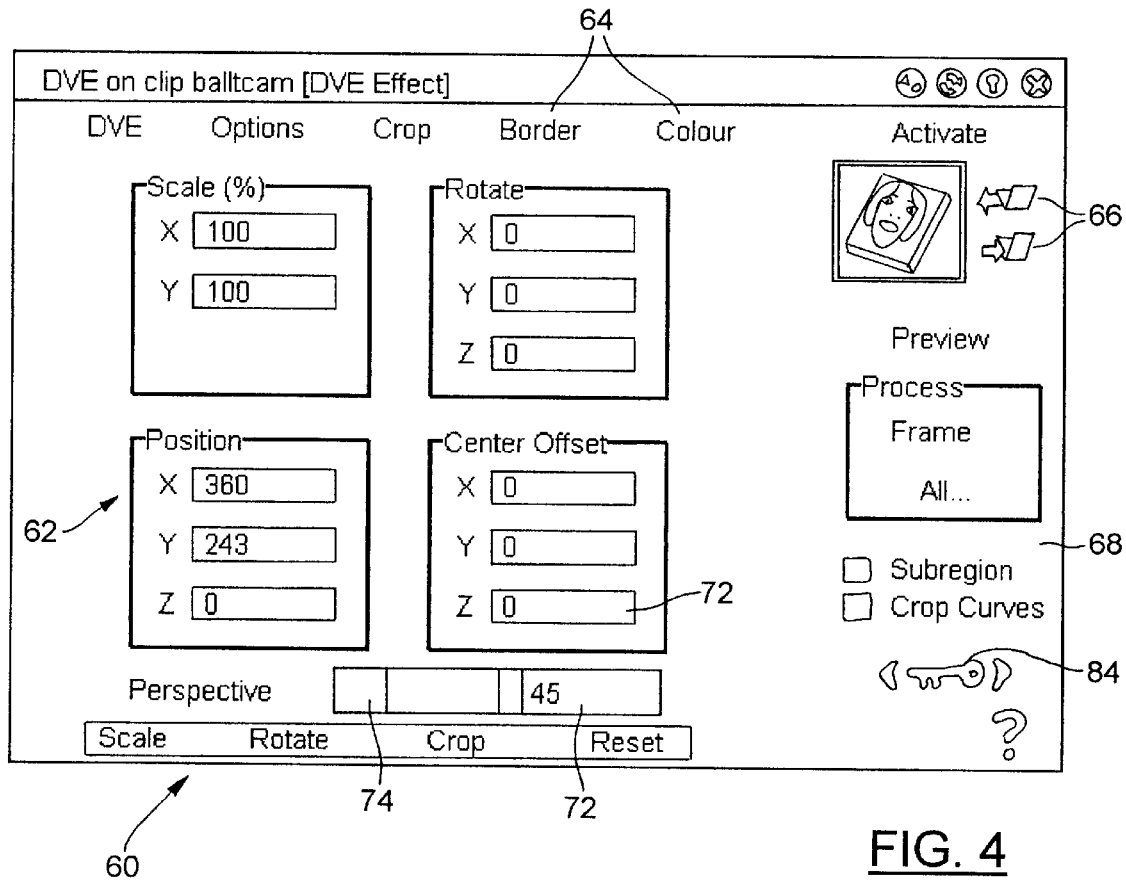
FIG. 4 is a visual representation of a computer display illustrating a property inspector.

Referring now to FIG. 4, a property inspector 60 is illustrated. The property inspector 60 has a number of class-specific property pages 62, 64. Property pages are single collections of controls assembled together into a property sheet. Any class of a family will include class-specific tabs on it, i.e. brush shape or blur parameters.

Each property page 62, 64 contains a number of UI controls, representing variables of some type. Numerical values are represented by complex controls, each of which can have a numerical value 72, a representative bar graph 74, or a combination thereof. Responsive to user input, the values of each can be increased or decreased.

How the inspector reacts to selection changes, object deletion, and the launching of new inspectors is determined by its mode.

Figure 5:
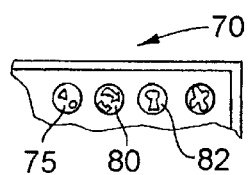
FIG. 5 is a visual representation of a toolbar illustrating icons for modes of operation for launching property inspectors.

Referring to FIGS. 5 each property inspector has in the respective toolbar a set of buttons 70 having a Recycle icon 78, a Focus icon 80 and a Lock icon 82.

There are three basic modes of operation for an inspector: Recycle, Lock and Follow. "Recycle" indicates that an inspector's frame can be re-used by the desktop if needed. The current contents, namely property pages and frame controls, will be replaced as necessary to reflect new information. "Lock" indicates that the inspector is bound to one particular object instance, ignoring selection changes. The deletion of the inspected object destroys a locked inspector. "Focus" indicates that an inspector will try to retain its current family and class during selection changes. If the family and class of a new selection match that of a focussed inspector, then that inspector will reflect the properties of the new selection. Otherwise, a new inspector with family and class matching is created.

In a preferred embodiment, inspectors indicate their mode via a set of buttons in the title bar of the inspector. These buttons are mutually exclusive: clicking one button resets, or cancels, the other button choices.

The basic algorithm for inspectors is as follows:

Never defocus or re-use a locked inspector.

If the user requests a new property inspector, check if there are any recycling inspectors. If there are, adapt the recycling inspector to reflect the new selection. If there are not, open a new recycling inspector to display the properties.

If the selection or tool changes, focus all the focusing and recycling inspectors of the new selection. Focusing inspectors get priority on reflecting their family in the new selection. If the new selection does not support the family of a recycling or focusing inspector, open a new inspector for that family. If the selection is heterogeneous, focusing inspectors will reflect their family/class for any of the selection that supports them. If none of the selected objects support the family/class of a focusing inspector that inspector will be hidden, or disabled.

If the user deselects everything, all recycling inspectors are closed. If the current interactive tool supports ambient properties and if one of the ambient properties match those of a focusing inspector, focus the focusing inspector(s) on those ambient properties. Otherwise, defocus the focusing inspectors. If the user deletes a selected object, all recycling inspectors are closed, or disabled.

Object parameters sets can be persisted as stand alone files to be reused within any other context. These files could just contain the CLSID of the object that can be applied to and a binary stream that is specific to this class. To allow the user to search for presets with more flexibility a header has been added to the preset file format. This header contains a thumbnail bitmap representation of the preset for a quicker identification. Further, a text description and a list of GUIDs is included to identify the families to which the object belongs.

To help the user find a particular preset as fast as possible, the last place a preset of the same family was accessed is stored in memory. If a family is being accessed for the first time and no preset of a family has ever been accessed, or if the last location does not exist anymore, a default location is registered for the family.

Several objects which can be used with the present invention contain parameters that could be animated. Animated objects allow a property to change over time and Function curves model how the value of an animated property changes over time. In order to shape a function curve, the user creates and edits one or more keys, which map a value of the property to a specific time.

The goal of the Animation Control mechanism is to offer a user interface to record the animation of all animatable properties of the inspected object. The Animation Control mechanism is divided into two distinct parts; the UI part presenting visuals to the user and the internal mechanism performing the actual animation operations such as setting a key, removing a key, going to the next key, etc. The UI part of the Animation Control is independent of the property inspector and can be detached from it and encapsulated within its own classes.

Figure 6:
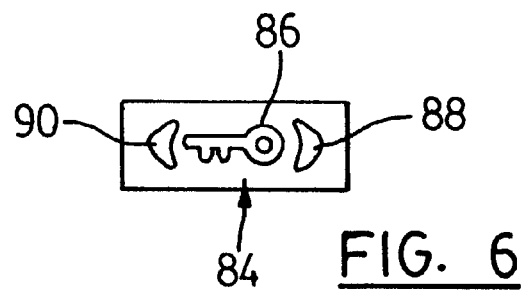
FIGS. 6 and 7 are visual representations of control buttons for Animation Control.
Figure 7:
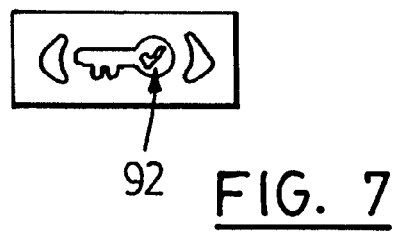

As shown in FIGS. 6 and 7, the Animation Control consists of an icon 84 having three separate buttons. The icon 84 has a "set key" button 86, a "go to the next key" button 88 and a "go to the previous key" button 90. The "set key" button 86 preferably has three states. A "key" will be displayed if, at a specific time, the parameter is on defined key, a "check mark" 92 if not on a key but the parameter is animated (i.e.—there is at least a key at another time point) and a blank key picture when the parameter is not animated.

Each time an object or several objects are connected to a property inspector, the Animation Control mechanism scans those objects for all their properties. From the tree structure containing all properties of the inspected object, the Animation Control mechanisms extracts all animatable parameters and creates an animation object for each element. This object embeds all information required to animate easily the properties of the inspected object. Those objects are finally inserted into an animation list.

Each animation object is manipulated individually, i.e. one object has no dependency on any other once created. Each animation object keeps a reference on a specialized COM interface dedicated to the animation of the container object and a cookie identifying uniquely the animatable property within the container object. As used herein, the term cookie is intended to comprise a token given by a host to a client, used by the host to identify a client object and distinguish it from other clients.

With these two pieces of information, the Animation Control can interrogate the container object about the animation state of its specific property, add or remove new keys in this property.

The UI part of the Animation Control gives the user the capability to set keys, remove keys at the specific time or to navigate from key to key within all animated parameters. Whenever the user initiates an action, the UI part of the Animation Control sends a command to the internal mechanism within the property inspector as a Windows registered message. The internal Animation control mechanism receives those messages and dispatches the requested commands to all animation objects contained in the animation list. Those animation objects will then make use of the specialized COM interface dedicated to animation and the cookie identifying the property to complete the operation. Sometimes, the internal Animation Control may have to accumulate or summarize information returned from those various animation objects before sending it back to the UI part of the Animation Control for updating the visual aspect of the UI. Finally, whenever new objects are connected or disconnected from the property inspector, the animation list is cleared and re-created.

As noted previously, several objects which can be used with the present invention contain parameters that could be animated. Once animated, those parameters contain a function curve allowing the parameter to take different value over time (see FIG. 9). Those objects have a section of time over which they are active; whenever the user resizes the objects, the section of time changes and the user must decide what to do with the curves.

There are two ways to manipulate the animation when resizing an object. The first way (i.e.—Cropping OFF) conserves the parameter values at its end points, i.e. at the beginning and at the end of the object timespan. The second way (i.e.—Cropping ON) manipulates the animated parameters so that it appears to the user as if the animation stayed in synchronization with the surrounding objects. Changing the duration of the object does not affect the position of the animation curves it contains in any way.

The operation of curve cropping is illustrated with respect to the following example. A commercial may have a fade out video effect between the 29th and 30th second of the commercial. Regardless of the information underneath the end effect, the fade level is going to animate from 100% to 0%. If the effect is shortened, for example, to run from 29.5 to 30 seconds, the end effect still goes from 100% down to 0, but in half the time. This is one behaviour for an animation group. This effect occurs in the Crop mode OFF.

An example where Crop mode ON would be used is if a ten-second clip has a portion shot outdoors (0–5 seconds), with the remainder of the clip shot indoors (6–10 seconds). As the camera moves from outdoors to indoors, the color balance of the image goes from correctly balanced to incorrectly balanced. The inside portion of the clip may look too red, because camera's sensing element was balanced for outdoor light. To correct, a color correction effect is applied to the clip to remove the color shift. The parameters for the effect do not change the color balance until the $6^{th}$ second, at which point they shift the color values to return the colors to their correct balance. If the user trims the effect so that it starts at the $5^{th}$ second, he will expect that the change in values will continue to happen at the $6^{th}$ second, thus the animation curves would be cropped and not stretched.

Figure 8:
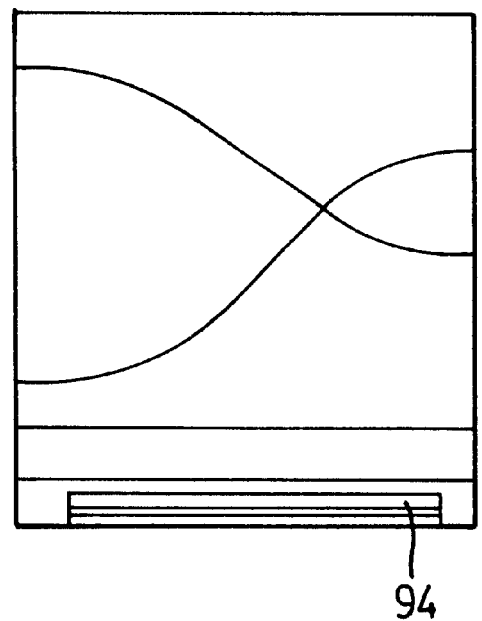
FIGS. 8, 9 and 10 are visual representations of function curve editors and illustrating different cropping modes.

FIG. 8 represents the curves of the animated parameters on an image effect. The object is represented by the bar 94. The timespan of the curve is the portion of the curve used by the object.

Figure 9:
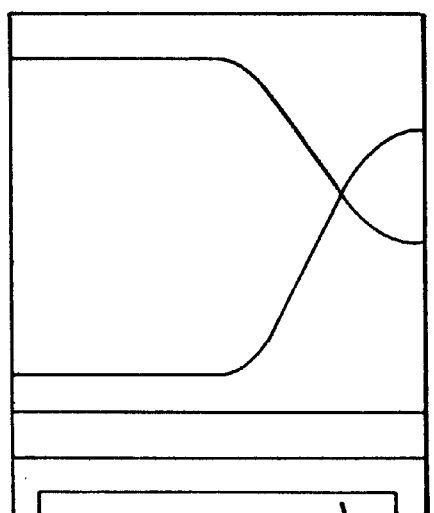

FIG. 9 presents the new shape of the curves once the object has been resized with cropping mode OFF. At the start and the end of the object, the same values as FIG. 8 are used for its animated parameters.

Figure 10:
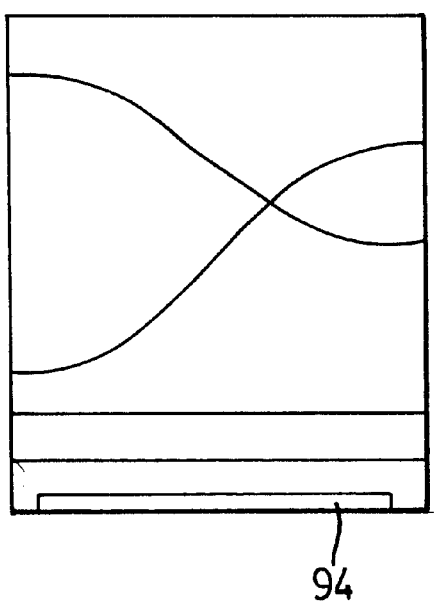

FIG. 10 represents the new shape of the curves once the object has been resized when the Cropping mode is ON. The curve has not been scaled, and the curves have stayed at the same position relative to surrounding object while the object containing the curve has been scaled down.

To implement this mechanism on the user interface, a simple toggle is presented to the user, allowing a choice between one mode or the other. Internally, based on the toggle value, different trimming operations are performed on the underlying curves that support the animation of the parameters.

Parameter animation values are stored into function curves. Those function curves contain a series of keys, all positioned relatively to the local start time of the object, i.e. time 0, containing them.

Whenever the container object is resized, it is notified with a resize notification that indicates where the resize operation was done, i.e. from the start of the effect or from the end of the effect. Furthermore, the notification provides the trimming amount, i.e. the value to add or remove the current timespan of the object. A negative trimming amount done at the start of the effect indicates that the effect has been enlarged while a positive value indicates that the timespan of the effect has been reduced. A negative trimming amount done at the end of the effect indicates the timespan of the object has been reduced, while a positive amount indicates the opposite. The system ensures that the timespan of an object cannot be reduced to a timespan of length 0. Furthermore, the system also makes sure that it is not possible to move the start of the effect after the end of it and vice and versa.

In Crop mode OFF, based on where the trimming operation occurred and the trimming amount, a new duration is computed for all animated parameters and passed on to the function curve contained therein. Once the new duration is calculated, a ratio is determined between the previous curve duration and its new duration. Finally, this ratio is used to scale the function curve, i.e. reposition all keys within the curve by multiplying the key position and all additional key positioning information by the ratio. Since all keys are already set relatively to the local start time of the object, the scaling can occur without having to perform any translation.

In Crop mode ON, a translation value to be applied to the curve is calculated. The value depends on the where the trimming is to start and the trimming amount. In this mode, if the trimming operation occurred at the end of the effect, the curve is left untouched. The key translations occur only when the trimming occurred at the beginning of the object. The translation amount is equal to the inverse sign of the trimming amount. Using this translation, all keys are shifted inside the curves to their new positions.

The present invention can be further described with reference to a particular example for controlling the rendering of images on a computer screen. The images are formed from a number of possible sources such as from video tapes or digitally stored images. The present invention has particular application to controlling the style of a graphics image rendering tool. The style is a property that includes a number of subcomponents that at least in part define how the image rendering tool applies text and brush strokes to a computer display.

The tree 130 depicted in FIG. 3 is one of a number of possible tree configurations that the graphics software presents to the user based upon the type of graphics control the user has selected in the console. The particular tree depicted in FIG. 3 is presented in response to the user selecting a "Freehand Tool" button 134 in the panel of the display. Drawing with the freehand tool imprints a series of stamps of a specific brush shape onto the surface of the viewing area 112 as the user moves the tool across the display with the cursor control 24. The user navigates the tree 130 by selecting the tree properties to allow access to subcomponent objects or branches. Selecting the style property launches a style inspector (FIG. 18) that helps define the properties and subcomponents of the style property.

If a surface of a property includes a "+" sign, this means the property includes subcomponents and by selecting the property on the "+" sign the subcomponents of the property are displayed, i.e. the tree expands to visually depict the subcomponents as families and classes. A property with no branches (i.e. a leaf on the tree structure) has a "-" designation on its surface. This is an indication to the user that there are no further constituent properties for that object. Clicking anywhere else launches the inspector for this property set.

Figure 12A:
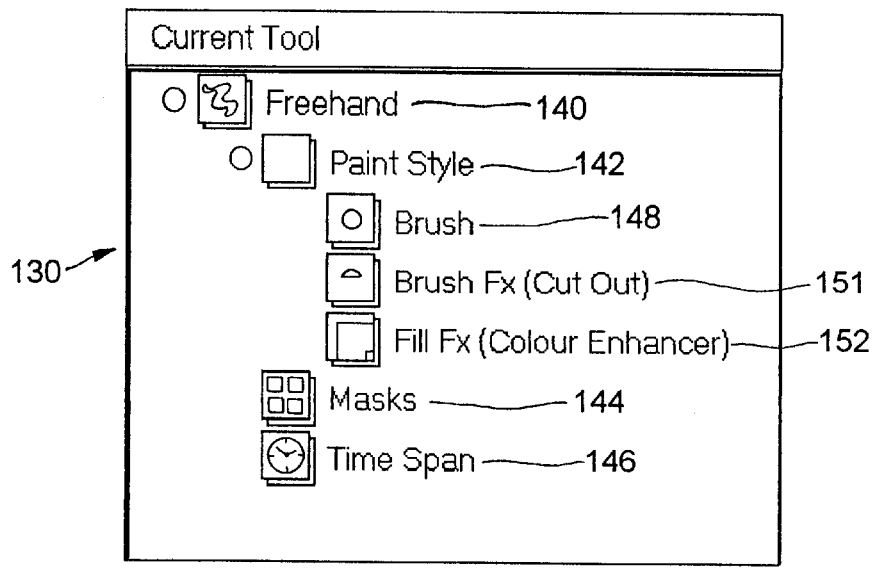
FIGS. 12A and 12B are schematic depictions of alternate hierarchical graphics objects that aid a user in controlling the painting or rendering of images on the computer display.

In order to simply depict alternate tree configurations encountered by the user, tree properties in the other drawings used to describe the invention are depicted as boxes that are interconnected to define their hierarchical structure. FIG. 12A, for example, is a simplified depiction of a tree structure 136 presented to the user beneath the panel 114 in response to selecting the freehand button 134. The tree structure 136 is represented to the user as a hierarchy:

Freehand
  Paint Style
    Brush
    Brush FX
    Fill FX
  Masks
  Time Span

A freehand tool object 140 has a style property 142, a masks property 144 and a time span property 146. Style property 142 has been expanded to show its three subcomponent families 148, 151, 152: brush subcomponent family 148, brush effect subcomponent family 151 and fill effect subcomponent family 152. When the drawing freehand tool is first selected by actuating the button 134 on the console 114 the various properties that make up the tool are defined by so-called ambient settings that are then in effect in the graphics mode. Regardless of whether a drawing tool or a text tool has been selected in the console region of the display, ambient settings of the software will define a default manner of the rendering performed by the selected tool unless those ambient settings are adjusted. The tree structure of FIG. 12A allows these ambient settings to be changed by allowing the user to interface with a property inspector for each property of the tree 136.

Figure 14:
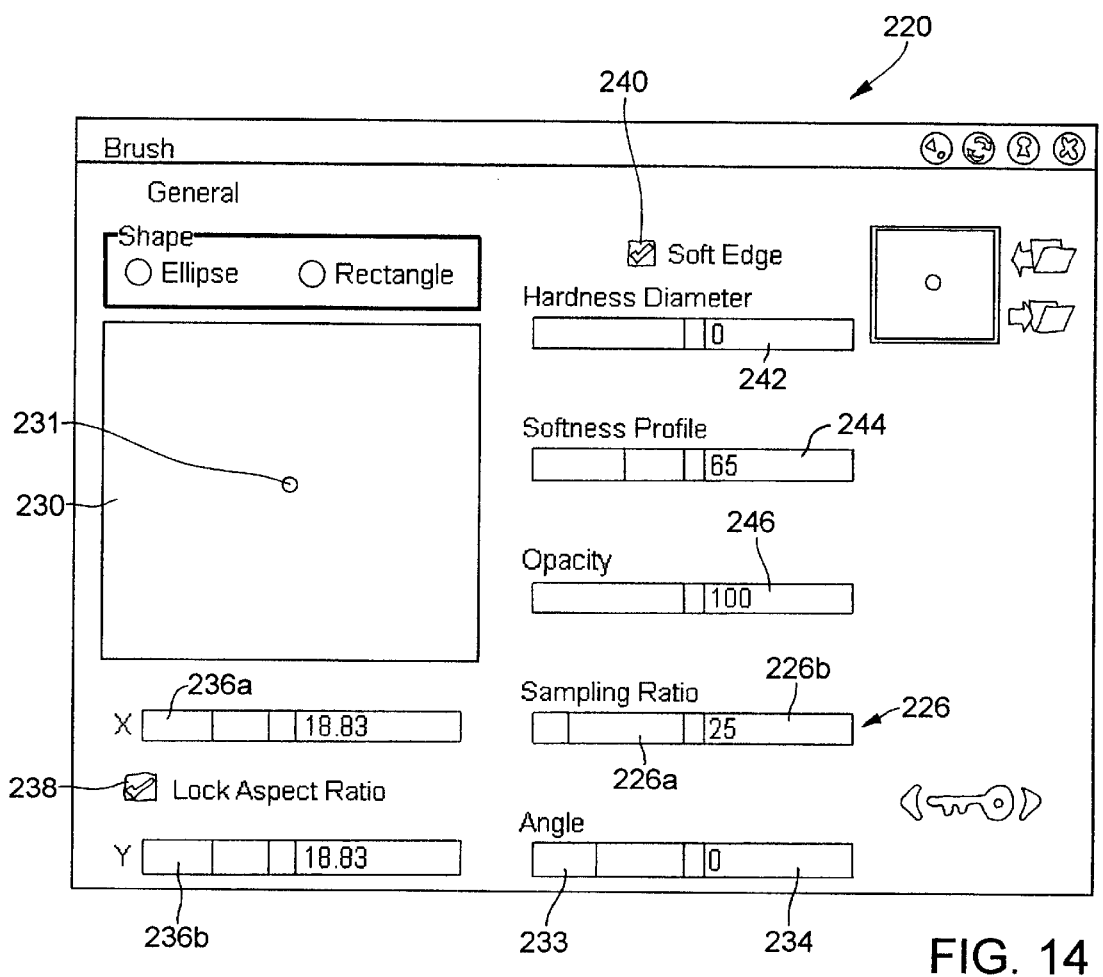
FIGS. 14 are depictions of brush editors for use in defining attributes of a brush.
Figure 15:
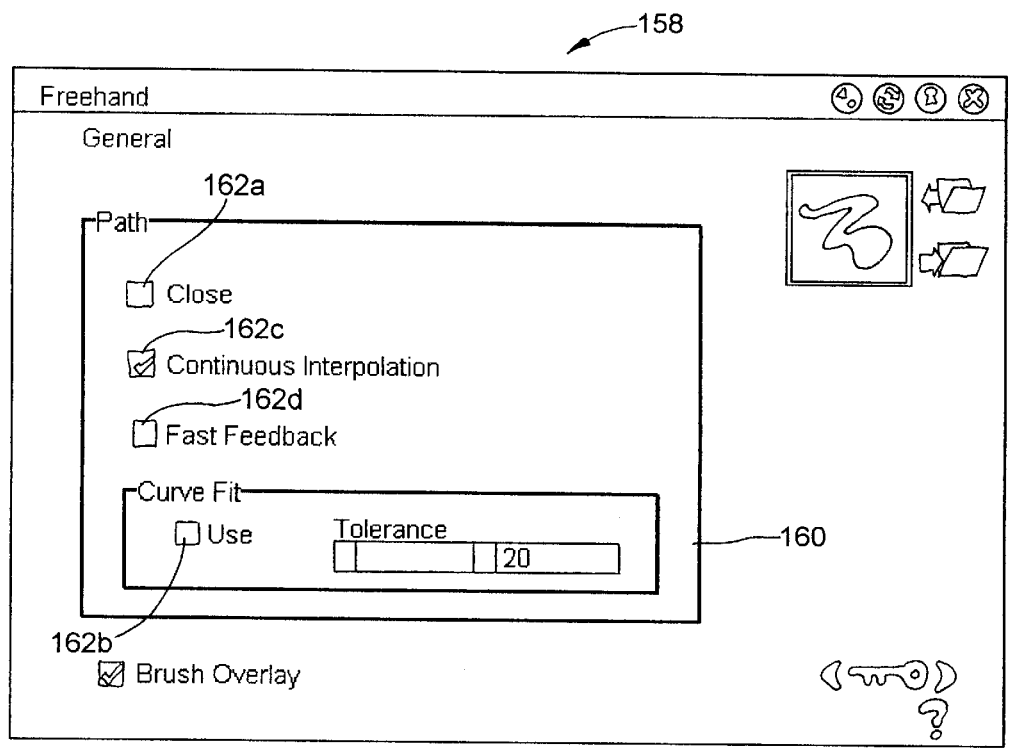
FIG. 15 is a freehand tool editor for use in defining the attributes of a freehand tool for use with the present invention.

Choosing the freehand tool object 140 from the tree 136 shown in FIG. 12A launches a freehand tool inspector 158 shown in FIG. 15. The freehand tool inspector includes means for defining the manner in which the software responds to freehand strokes applied to an image in the viewing region. The inspector includes a path box 160 that allows the user choose one of four checkboxes 162a–162d to select either a closed stroke, a curve fit, continuous interpolation or fast feedback. The property inspectors for a representative sampling of other imaging properties depicted in FIG. 12A are illustrated in FIGS. 14, 15, 18, 17A, 17B, and 18.

The simplified tree structure of FIG. 12A includes a style object 142 as a property of the freehand tool object. The style object 142 contains within it a definition of various families required to perform a specific graphics rendering task. As an example, the following two freehand drawing tools are made up of the same properties but with different settings for their attributes to achieve a desired effect.

EXAMPLE 1

Finger Painting

Tool: Freehand
Brush: Elliptical, with a radius of 50×50 pixels, soft-edged, with hardness diameter of 0, softness diameter of 0, opacity of 100%, sampling ratio of 10, angle of 0 degrees. Effect applied: smear, with melting parameter of 96, Wetness of 90.

EXAMPLE 2

Cubistic Smear

Tool: Freehand
Brush: rectangular, with radius of 30×+pixels, soft-edged, with hardness diameter of 59.46, softness diameter of 55.41, opacity of 100%, sampling ratio of 10, angle of 45 degree. Effect applied: smear, with melting parameter of 98, wetness of 94.

Each of these effects can be controlled by means of the inspectors associated with the style object and the properties that make up the style object such as the brush object 148.

Figure 16:
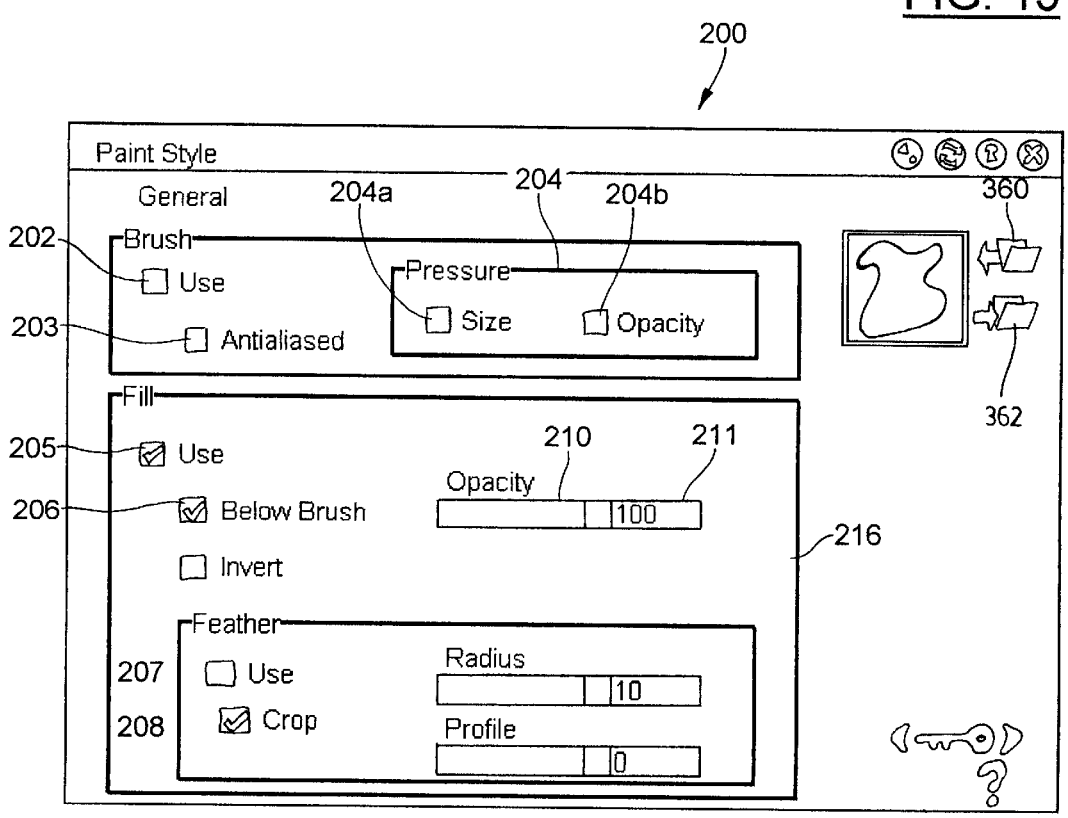
FIG. 16 is a depiction of a paint style editor for use with the present invention.

General style parameters are controlled through the paint style inspector 200 which is depicted in FIG. 16. The paint style inspeetor allows the brush and fill parameters to be controlled by means of a number of checkboxes 202–208. By selecting an appropriate combination of these check boxes the user can control the rendering of a stroke with or without a brush. If the system includes a pressure sensitive tablet the stroke can reflect the pressure applied to the tablet. An initialized checkbox allows jagged lines to be smoothed when drawing curved or diagonal strokes. The checkbox 205 allows the user to create strokes with fill. Such strokes will have interior regions shaded with fill in accordance with a fill transparency controlled by an opacity slider 210 and an accompanying text box 21 1. A feather box 216 on the inspector 200 allows the edge of the fill to be controlled at the region the fill approaches the stroke.

A brush inspector 220 is illustrated in FIG. 14. As seen in the FIG. 12A depiction illustrating the freehand tool tree organization, the brush family is a subcomponent of the paint style object 142. Use of the brush inspector allows the user to define the brush and therefor change the characteristics of the paint style of which the brush property is a defining part.

Since the brush is a property of the style, the inspectors are designed to link the characteristics so that changes made using one inspector are automatically reflected in a second inspector when the first inspector is modified. A sampling ratio control 226 is used to set the distance between each brush stamp in a stroke of the brush. A lower value creates a short distance between each brush stamp, causing the stroke to be denser and a higher value creates a wider distance between brush stamps causing each stamp to appear more distinctly. The sampling ratio control 226 includes both a slider 226a and a text box 226b for adjusting the sampling ratio.

The brush property includes a brush size and. In the above two examples of the Cubic Smear and the Finger Painting the shapes were rectangular and elliptical. As seen in FIG. 4 brush property 220 includes a viewer 230 that illustrates a stroke 231 for the freehand tool that allows the user to monitor effects on the stroke as the user adjusts the brush attributes. The user can make a shape selection to start a new brush or as described below can begin with a selected stroke and modify the brush used to create it. An angle controls 232 adjusts the axis of the brush shape. This angle can be adjusted by either entering a value in a text box 233 or by adjusting a slider 234. Width and height controls 236a, 236b adjust the size of the brush and a lock aspect ratio checkbox 238 links the two controls so that an adjustment to either the width or the height automatically adjusts the other. A "soft edge" checkbox 240 toggles between a soft edge and a hard edge for the brush. A hard edge has a sharply defined border and a soft brush edge has an adjustable gradient that gives the edge a soft or fuzzy appearance. If the soft edge is chosen with the checkbox 240, a diameter control 242 controls the hard portion of the brush as a percentage and a profile controls the gradient or rate of fall off from the hard portion of the brush. A softness profile 244 controls the percentage of the edge that appears soft or fuzzy when the soft brush edge is chosen. An opacity control 246 determines the level of brush transparency. A value of 0 creates a brush stroke that is totally transparent and a value of 100 cause the edge to be drawn exactly as the color property inspector depicts the color.

Turning to FIG. 12A, one sees that the paint style property 142 has a brush effect subcomponent 151. An inspector for this subcomponent (not shown) allows the color of the brush to be determined from a palette of available colors. Additionally the choices available from the palette can be adjusted by means of slider controls that dictate the red, green, and blue properties of the palette selections.

It is also possible to change the properties of a selected stroke that is already contained within the viewing area 112. To access and change the properties of an already created stroke the user selects a "select" button 150 on the console (FIG. 3) and then selects a stroke within the viewer area 112 of the display. A bounding box of the stroke is displayed on the viewing area 112 and a tree or properties of the selected object 250 depicted in FIG. 12B replaces the freehand tool tree 130 depicted in FIG. 3.

Figure 12B:
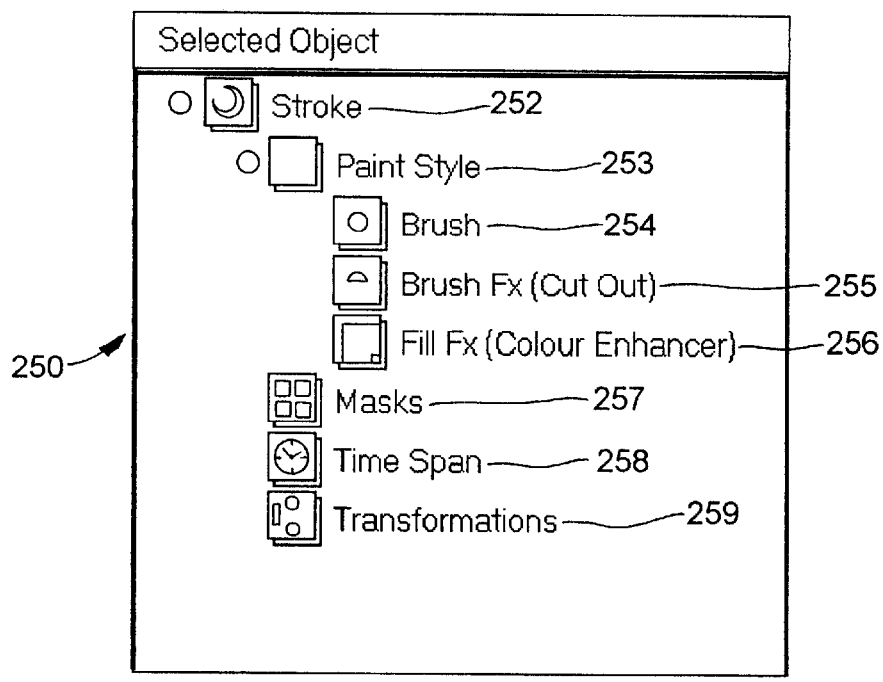

Note that the tree of FIG. 12B is quite similar to the property tree 136 depicted in FIG. 12A. The tree 250 has properties 252–259 arranged in a hierarchical fashion:
Stroke
    Paint Style
        Brush
        Brush Fx
        Fill Fx
    Masks
    Time Span
        Transformations
The object 252 is a stroke property set and selecting this property set causes the paint style inspector 200 or brush style inspector 220 to be displayed, as described above.

The property trees 136, 250 of FIGS. 12A and 12B each includes a mask property 144, 257. A mask is an image, portion, or property of an image that defines which pixels, paint strokes, and titling characters affect the image. The mask property inspectors allow the user to select which RGBA channel to mask, add a paper grain, or mask the image with an alpha channel to create a matte. Mattes are defined by the alpha property of an image and in the paint mode are used by the graphics software to define a stencil. The matte protects portions of the image surface.

Figure 17A:
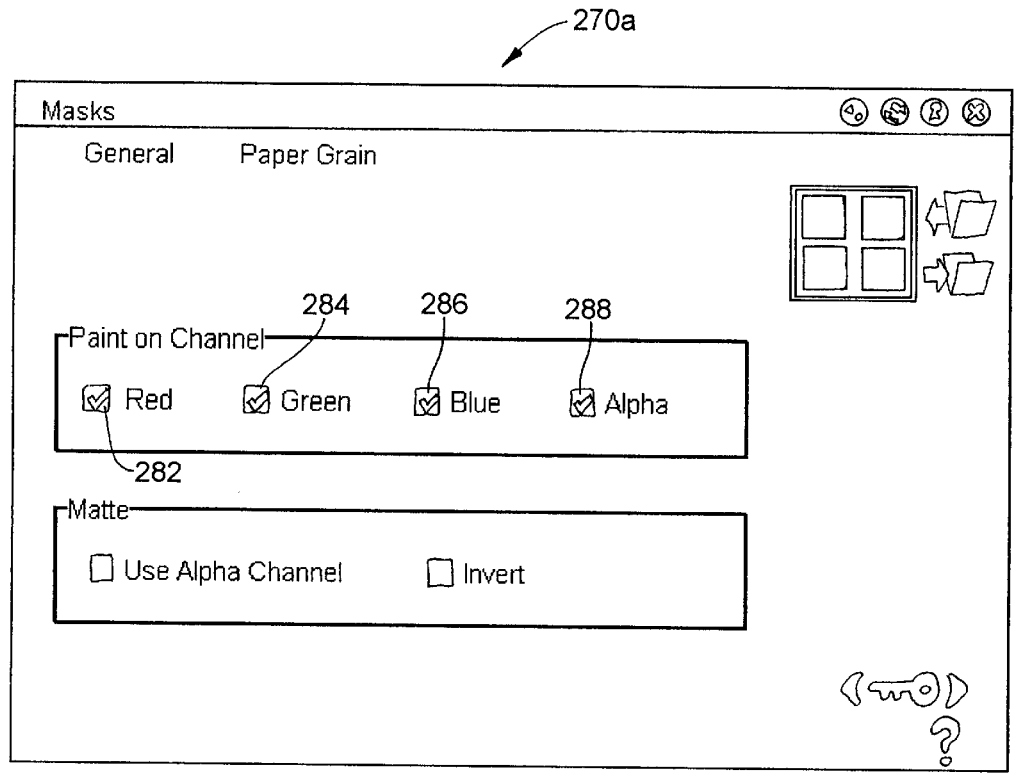
FIGS. 17A–17B are depictions of editors for use in defining masks for use with the present invention.
Figure 17B:
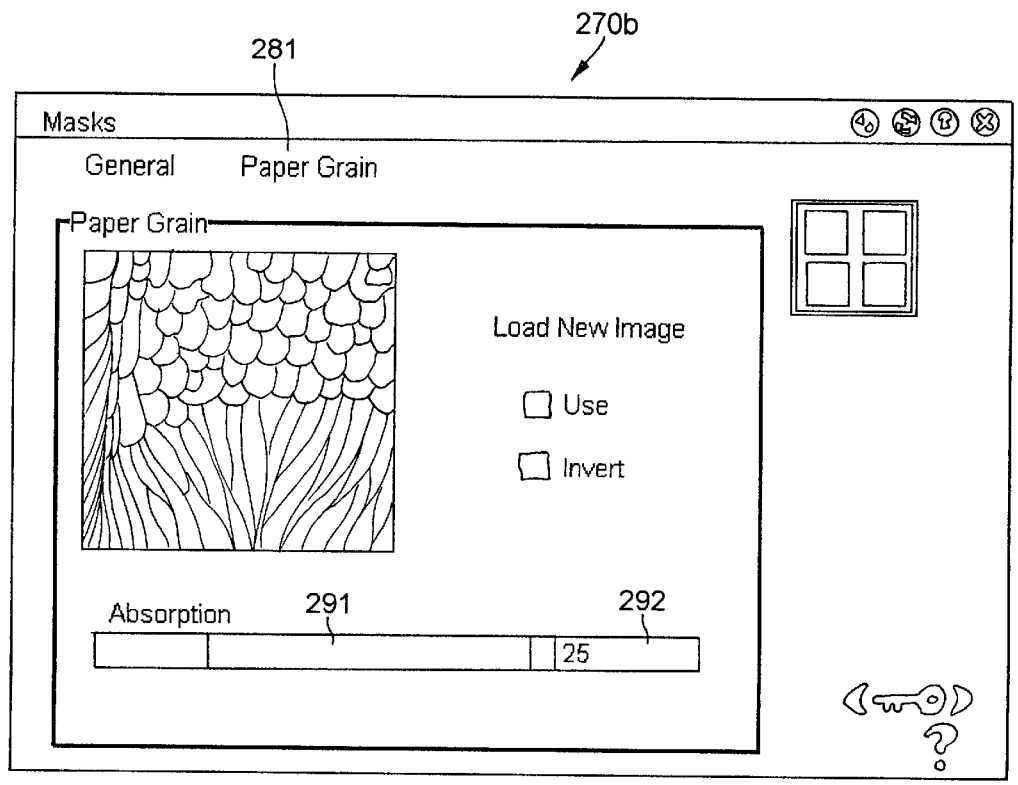

The mask inspector is launched by selecting the mask object on the tree of FIGS. 12A and 12B and includes three tabbed displays 270a, 270b that are depicted in FIGS. 17A and 17B. A paint on channel box 280 has four checkboxes 282, 284, 286, 288 to allow different channels to be painted. As an example, if the red channel 282 is selected, only the strokes red property is painted. By painting with the alpha channel 288 one paints with a matte.

A paper grain tab 281 (FIG. 17B) slows a texture to be applied to subsequent brush strokes. This will allow one to create an effect of painting on a textured canvas. A paper grain image is displayed in a viewing box 290 and can be adjusted by loading in other images from disk. A text box 291 and slider 292 control an absorption factor. This will control how paint that is applied by brush strokes is absorbed by the textured surface of the paper grain.

Once all properties of the drawing tqol object have been defined by means of user selection and control in the property inspectors, the drawing tool has been defined and the user can select the viewing area 112 and begin to add strokes that have the chosen style to the image in the viewing area. A representative sampling of the inspectors used in defining the tree properties in FIGS. 12A and 12B have been described. It is appreciated, however, that the properties such as fill and fill effect have their own inspectors for adjusting their property attributes. The wetness and melting parameters, for example, control the smear Effect in the Smear Effect Inspector. These two parameters can affect brush strokes that follow paths and control the combining with the existing brush stroke with the previously rendered portion of the image over which the brush is moved. Melting controls the area in which the image is combined and wetness controls the degree or intensity of the combination.

In addition to stroke based brush defined rendering, the graphics software supports text generation much like a word processor. The user creates and edits text in a titling body. The titling body is a group of words, lines and paragraphs which the user can manipulate like a single graphic object. When a titling body is created it inherits ambient text properties that define its appearance. Titling properties include character edge, fill and shadow effects as well as masks. The appearance or format of the text can also be controlled using text formatting options such as margin width, font size, leading etc. When the user is creating and editing text the text is displayed in the viewing area 112 of the display 28.

Figure 13A:
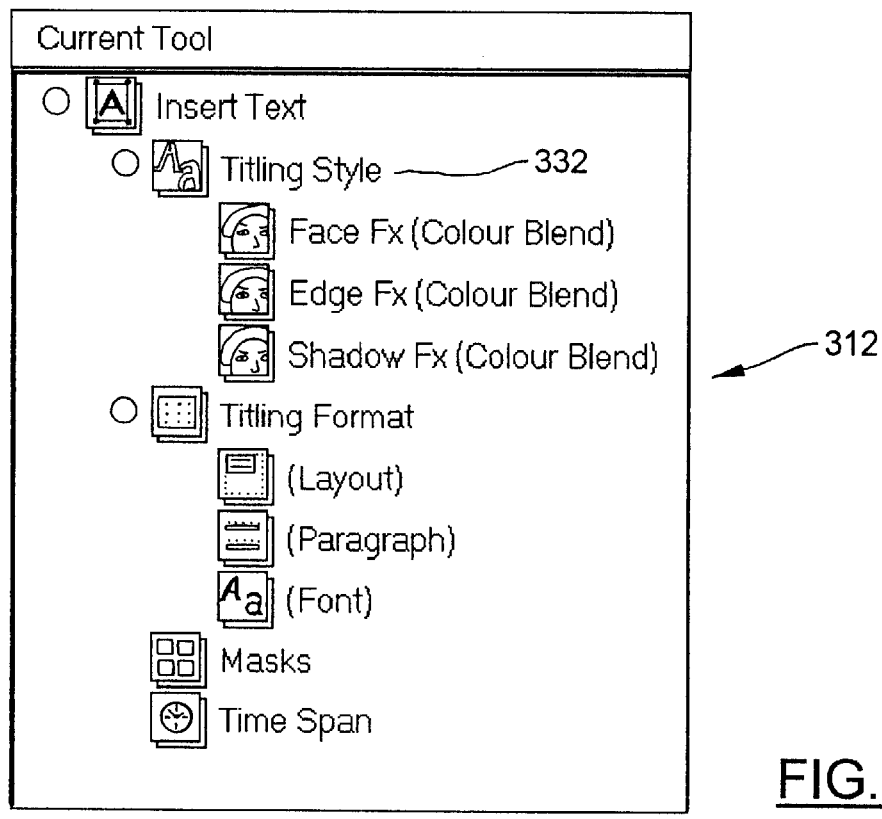
FIGS. 13A–13C are schematic depictions of a sequence of hierarchical graphics objects for controlling the depiction of text on a computer display.

To create a titling body, the user selects a "text" button 310 on the console 114 and the software displays a text tree 312 as illustrated in FIG. 13A. The user then moves the cursor over the viewing area 112 and selects with the pointing device 24 to create a new text body at the selected location within the viewing ara 112. When the user clicks in the viewing area to create a new body, a "edit text" button 316 in the console 114 is depressed and the "text" button 310 is deselected. The tree 312 changes to the tree 320 of FIG. 13B to reflect the format of the body that is now selected. If text is then typed without adjusting this format, the text that is typed has the ambient attributes of the text titling body. If the user adjusts the format before typing subsequent keystrokes the text will have the newly defined text attributes.

Figure 13B:
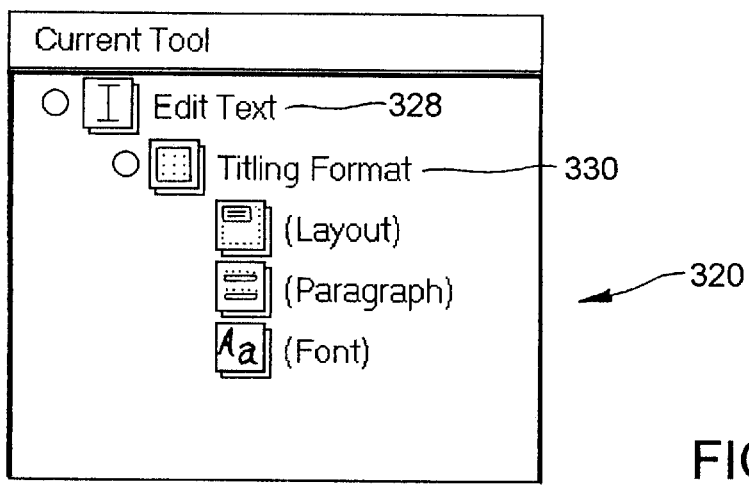
Figure 13C:
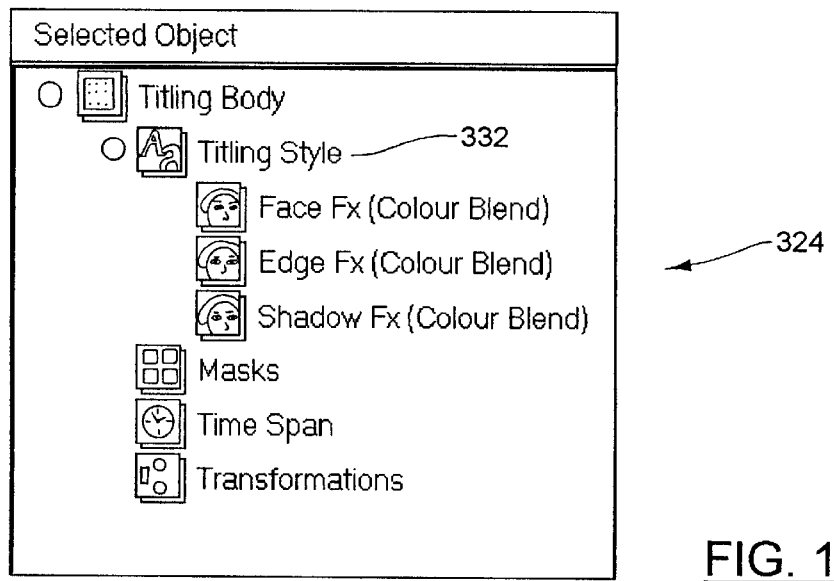

As was the case with painting brush strokes discussed above, the user can select and view attributes of already existing text contained within a titling body. The user clicks on the "select" button 310 and then moves the cursor over a text body within the viewer area 1 12. By clicking on the text body, the tree 324 of FIG. 13C is displayed and the style attribute of the selected body is shown. When this happens, the format of the body is not shown in the tree depiction. To display the format of selected text, the user chooses the "edit text" button 316 and the tree 320 of FIG. 13B is shown having a top "edit text tool" object 328 and a format property 330.

Figure 19:
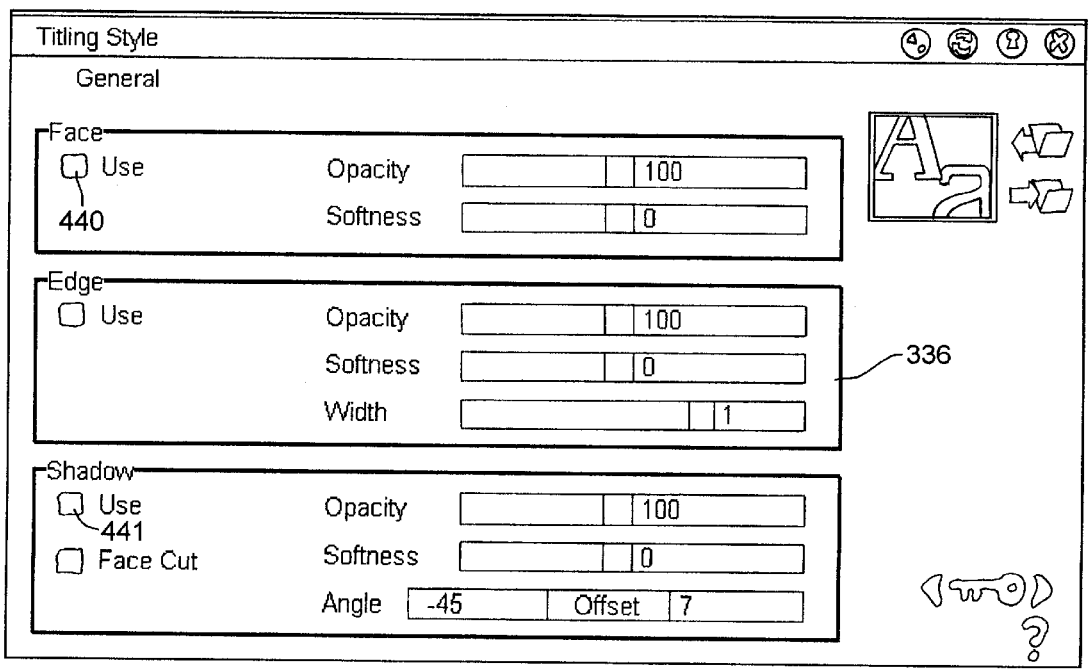
FIG. 19 is a titling style editor for adjusting a manner in which text is displayed within a viewing area of the computer display.

Each of the subcomponents beneath the text style property and the format property has a property inspector associated with it for adjusting or displaying the attributes of that subcomponent. As one example, when the clicks on a "style" property 332 depicted in either FIGS. 13A or 13C a titling style inspector 334 (FIG. 19) is launched. This inspector includes an edge attributes panel 336 having a checkbox 338 for using character edges defined by a separate edge inspector. If the checkbox 338 is checked and no changes are made to these character edges, ambient values are used. Similarly, the face and shadow attributes of displayed text are controlled by checkboxes 440, 441 and controls associated with those checkboxes.

Figure 11:
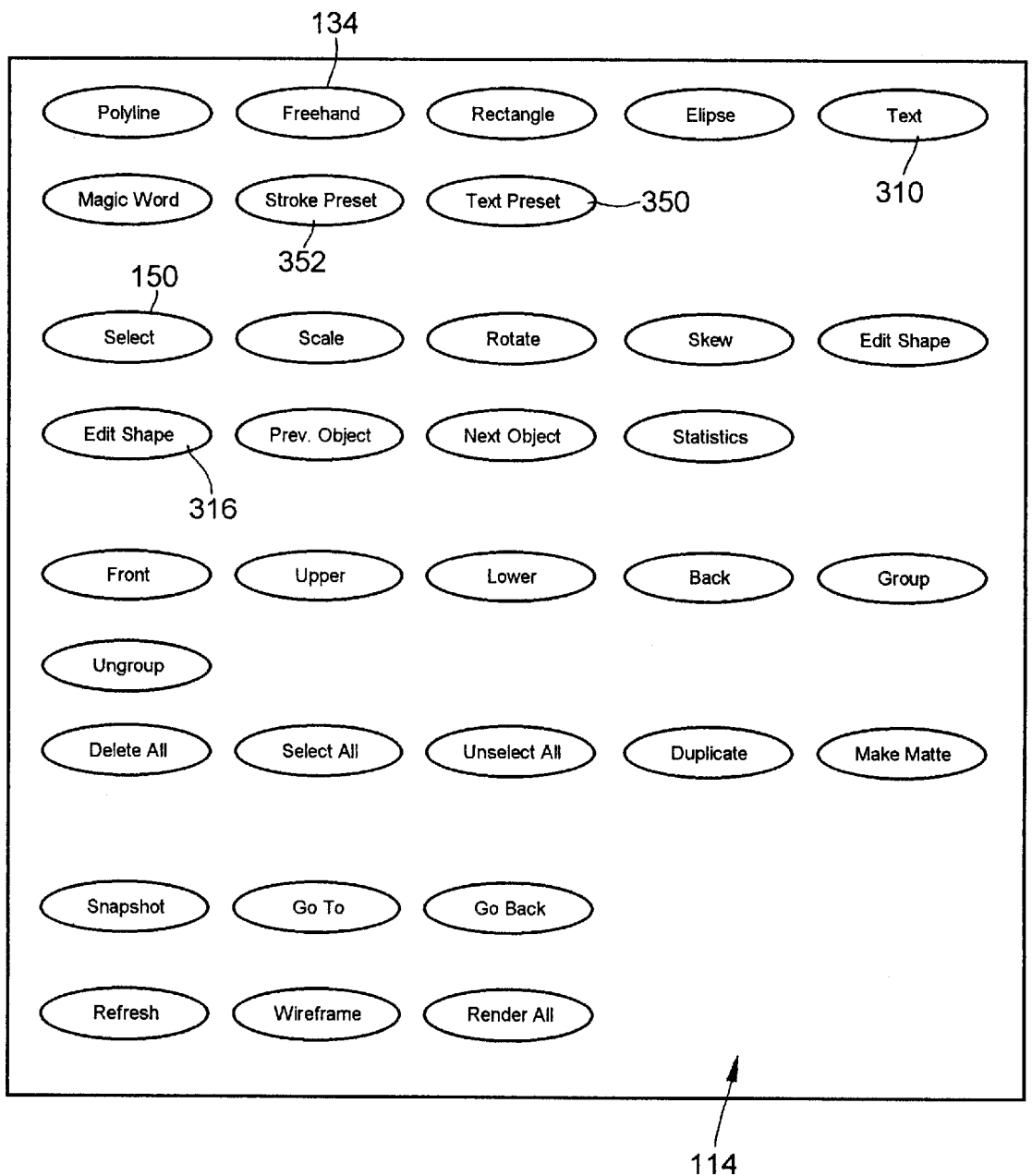
FIG. 11 is an enlarged graphic depiction of a portion of the computer display of FIG. 3 showing a number of push buttons for activating graphic rendering functions on the computer display.

Turning to FIG. 11 one sees that there are two buttons labeled "text preset" 350 and "stroke preset" 352 in the console region 114 of the graphics display. The attributes for a plurality of custom or preset styles can be stored within a memory store such as a computer fixed disk drive. Under the control of the user, some or all of the stored attributes for a designated preset are retrieved from memory so that some or all of the attributes of a particular style preset can be associated with a graphics rendering object or tool. Subsequent use of the tool is controlled, at least in part, by the attributes of the style preset.

A preset is a customized set of properties for a particular effect, such as a paintbrush, font, or color palette. The software also comes with a set of text presets such as single line fade in, text rolls, diagonal flyins. When the software is installed, a full array of predefined presets are loaded and these pre-sets can be supplemented by the user.

Figure 18:
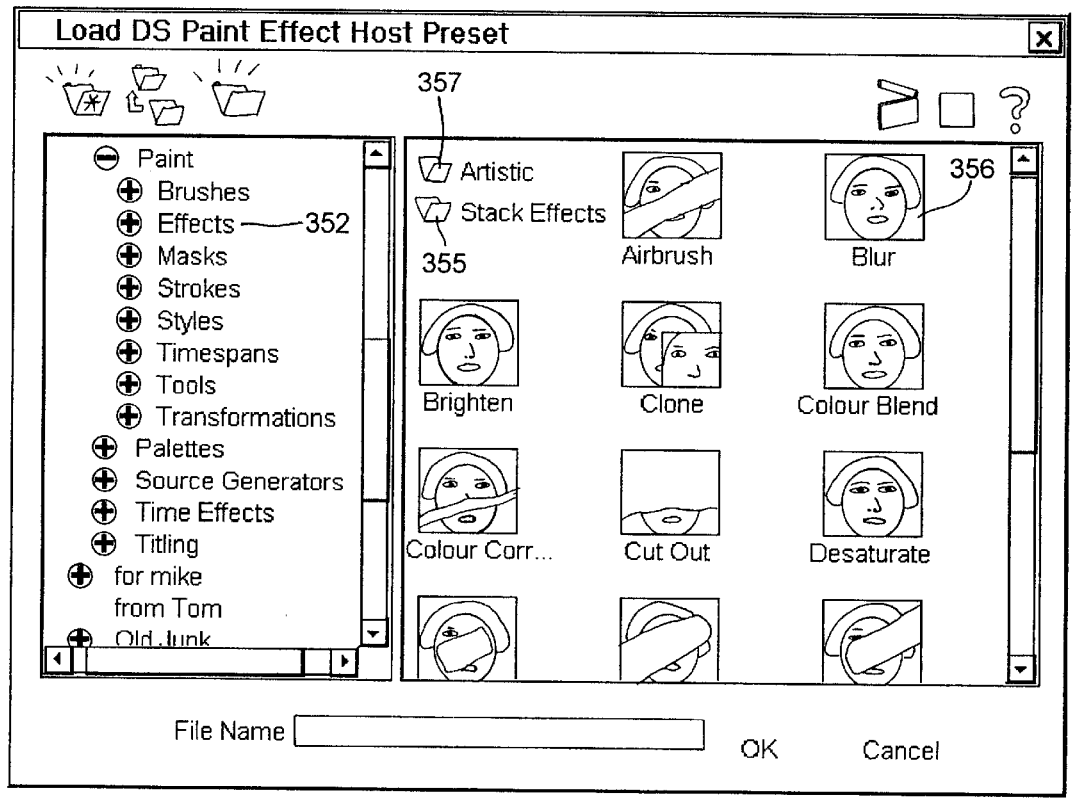
FIG. 18 is a depiction of a preset browser for use in obtaining paint object attributes from a storage device such as a disk drive of the FIG. 1 computer system.

FIG. 18 is a depiction of a preset browser 354 for accessing these stored presets. Use of a stroke preset creates a graphic layer on top of the image currently displayed in the viewing area 112. To use a stroke preset the user selects a button 352 which causes the browser 354 to be launched with a stroke subfolder 355 opened. The user selects one of the stroke presets 356 and the stroke is displayed in the viewing area 112. To remove a preset from the image in the viewing area 112, the user chooses the "Select" button 150 and clicks on a stroke within the viewing area 112. The user then presses the delete key on the alphanumeric control 22 to remove the stroke from the viewing area 112.

Use of stored presets allows the user to edit a property or graphics property within an inspector and then save that property as a preset. When the user selects a preset from the browser 354, its settings are loaded from disk into the appropriate property inspector for use or for modification with those inspectors. As an example, from the browser 354 one can retrieve a preset brush, a brush folder 356 into the brush property inspector. As seen in FIG. 11 the user can choose from a number of preset subfolders and these presets can contain other presets. For example if one saves a paint style preset in an artistic subfolder 357, one saves attributes of the paint style, the brush that defines part of the style, the brush color blend that defines part of the brush, the fill, the fill color blend etc. These are all accessible from a single style preset.

To use a property preset to paint brush strokes the user either selects a stroke to be modified from the viewing area 112 or selects a drawing tool if a new stroke is being drawn. A graphics tree depicted in either FIG. 12A or 12B is displayed beneath the panel 114. The user then selects the property from the tree for which the user wishes to load a preset. Assume a paint style object (found on both trees 136, 250) is selected by the user. The paint style inspector 200 of FIG. 16 is launched. This inspector 200 includes a load button 360 in the upper right hand corner of the inspector.

Figure 21:
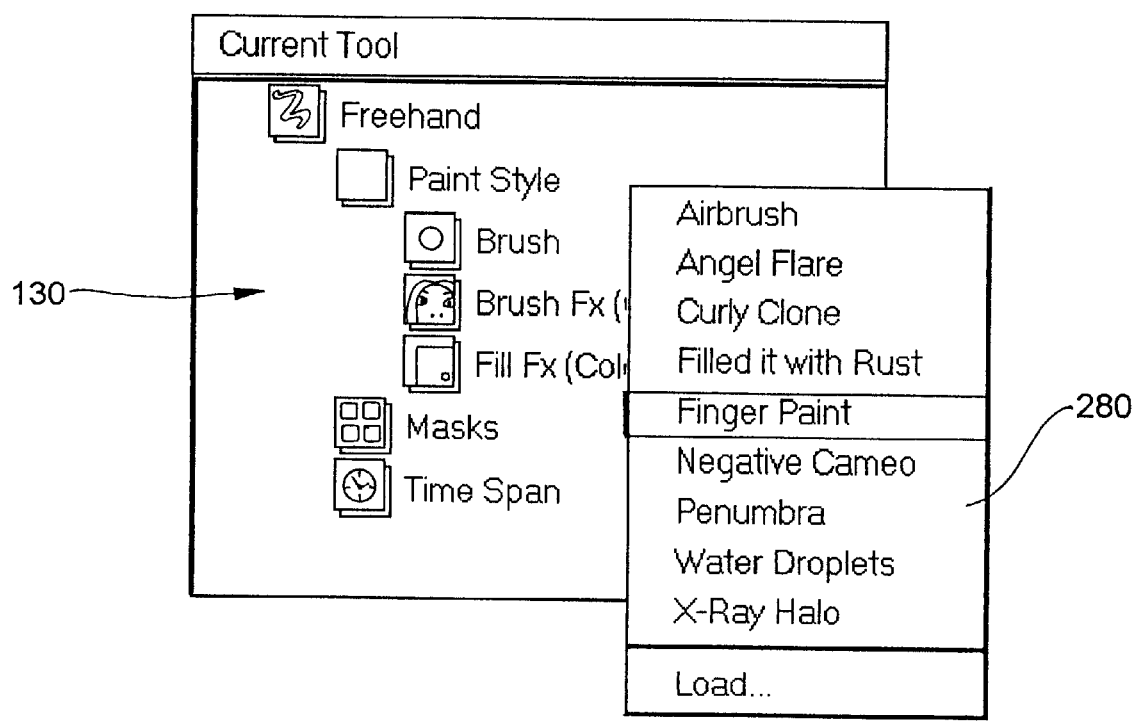
FIG. 21 is a schematic depictions with a drop down menu for presets selected, for use with the present invention.

When the user presses this button 360 the browser 354 is launched with the artistic folder 357 opened. The user then selects one of the paint style presets from a list of available paint styles and the preset property settings are applied to the selected stroke or if the preset is being used to create a new stroke the preset properties define new ambient properties. Alternatively, the user can right-click on an entry in the property tree to load a preset directly, such as paint-style. A list of presets for the family and class of the node clicked on are displayed in a contextual menu 280, as shown in FIG. 21.

Returning to FIG. 16, one sees that the paint style inspector 200 also includes a "save" button 362. As the user experiments with different paint styles, by an iterative process of trial and error, a particular stroke achieves exactly the desired affect in the image viewing area. To save that stroke or its style the user selects that stroke in the viewing area and the property tree of FIG. 12B is displayed. If the user wants to save the style of the stroke, the user selects the paint style property 253 of the stroke tree 250 and then the paint style inspector 200 of FIG. 16 is displayed.

To save a preset from the inspector, the user selects the save button 362 of the inspector and a save preset browser (not shown) is launched. This browser allows the user to save the property under its own name ("mypaintstyle", for example) within a subfolder for later retrieval. The preset can be saved in an existing folder or a new folder can be created within the hard disk organization for the presets. Presets of different properties can be saved in the same folder so that, for example, all presets for a particular project could be saved together or alternately all the presets of a particular type can be saved in a pre-defined subfolder for presets of that type. The load preset browser allows the user to view a listing of all types of presets within a given folder. In a manner well known to UI users, presets can also be dragged and dropped onto a toolbar as icons which can then be selected with a mouse click to apply the preset automatically.

Text presets allow the user to replicate titling styles and formats. To use a text preset, the user selects the "text preset" button 350 in the graphics console, and a load titling body preset browser launches to allow a text preset to be loaded. Text styles for user generated text can be saved by selecting the text and then choose a text property from the text tree (FIGS. 13A–13C) for saving. Any stroke of text property can also be selecting from the viewing area and then one or more of its properties modified in its associated inspector before it is saved to disk. If the user chooses not to save the modified property as a preset, the modifications can merely be applied to the selected stroke or text and saved with the image. The ability to select a stroke or text body and view, modify or save as a preset the attributes or characteristics of the selected property is a particularly useful feature of the present invention.

Each of the components or properties depicted in the various property trees is implemented as an object in the C++ programming language and has well defined attributes or components as well as methods associated with it. A paint style object, for example has a brush component which itself is an object in the C++ sense of the term object. As seen in the hierarchical trees of FIGS. 12A and 12B the freehand and stroke objects each include an object of type "mask" which has its own properties and methods.

It is not required (although it is preferable) to use C++ to write such objects. What is required is the use of the Component Object Model (COM) designed by Microsof, or another model providing similar services. This allows an object (or any other data structure) to expose interfaces through which other components of the system can act on their data. So, all global services exposed by the objects that could eventually be provided by third party plug-ins, will be exposed via COM, or COM-like, interfaces. Similarly, any services provided by the system to be used by these objects will be exposed via COM, or COM-like, interfaces.

The paint style object exposes many services to the software in addition to the properties and attributes of the style itself. One service is IpersistStream which allows an object of type paint style to be saved as a preset and retrieved. An IdsPropertyTree interface allows an object of type paint style to be displayed on the monitor as a tree with its properties depicted. An interface called IspecifyPropertyPages allows the properties to be displayed within an inspector wherein the properties of the paint style can be modified. An interface called IMFTimeSpan allows the paint style object to have a start time and a duration. The facility is useful for animation. A separate interface called IdsAnim allows the paint style to be animated. Access to an IDSChild interface allows an object of type paint style to specify its parent. As an example, the paint style of FIG. 12B is the child of a paint stroke object 252. The IDSParent interface allows the object of type Paint Style to replace or modify its child object such as for example its brush properties. By replacing the brush (child) with a stored preset (stored using the persistence service of the brush type) the object of type paint style can be changed and applied to a given brush stroke or saved as a style preset.

Listed below is an interface for an object of type brush that inherits these basic services from an "Iunknown" interface. The design of interface declarations for other properties or objects such as the paint style object are apparent to one skilled in the art when considered in conjunction with the present description.

```
/////////////////////////////////////////////////////////////////////////
// Brush Interface                                                    //
/////////////////////////////////////////////////////////////////////////
DECLARE_INTERFACE_(IDSBrush, Iunknown)
{
    Clone                (REFIID, LPUNKNOWN*);
    SetBrushImage        (IDSImage*);
    ResetBrushImage      ();
    GetBrushImage        (IDSImage*);
    GetBrushImageRes     (long&, long&);
    SetBrushInput        (IDSImage*);
    GetBrushInput        (IDSImage*);
    SetBrushShape        (GkShape2f*&);
    GetBrushShape        (GkShape2f*&);
    SetFeatherDiameter   (double);
    GetFeatherDiameter   (double&);
    SetCurvature         (double);
    GetCurvature         (Double&);
    SetSoftness          (BOOL);
    GetSoftness          (BOOL&);
    SetBrushAlpha        (double);
    GetBrushAlpha        (double&);
    SetBrushWidth        (double);
    GetBrushWidth        (double&);
    SetBrushHeight       (double);
    GetBrushHeight       (double&);
    SetBrushShapeAngle   (double);
    GetBrushShapeAngle   (double&);
    Build                ();
    StampFlush           ();
    StampBuild           (IDSImage* &, double, double, double);
    StampRect            (Crect&, double, double, double);
};
```

The above-described embodiments of the invention are intended to be examples of the present invention and alterations and modifications may be effected thereto, by those of skill in the art, without departing from the scope of the invention which is defined solely by the claims appended hereto.

SCHEDULE A

| Family | Example Classes |
|---|---|
| Audio Filters | 3 Band EQ |
|  | Gain |
| Audio Transitions | Crossfade |
| Image Filters | Blur |
|  | Sharpen |
| Image Transitions | Wipe |
|  | Dissolve |
| Keyer | Hardware Keyer |
|  | Software Keyer |
| Palettes | (degenerate) |
| Time-based effects | Interlace |
|  | Timewarp |
| Brush | (degenerate) |
| Paint Effect | Clone |
|  | Erase |
| Mask | (degenerate) |
| Stroke | (degenerate) |
| Paint Style | (degenerate) |
| Timespan | (degenerate) |
| Transformation | (degenerate) |
| Body | (degenerate) |
| Font | (degenerate) |
| Format | (degenerate) |
| Layout | (degenerate) |
| Paragraph | (degenerate) |
| Titling Style | (degenerate) |

We claim:

1. A system for adapting an object for a plug-in environment comprising an object having a hierarchical organization of attributes ordered into families with classes within the families, means for receiving said object and applying said object to a stream of data, a user interface for displaying said hierarchical organization of attributes of said object, launch means for launching an inspector, said inspector having means for displaying a setting of attributes of said object and having means for modifying said setting of attributes.

2. A system as claimed in claim 1 further comprising a plurality of objects, said plurality of objects share said hierarchical organization of attributes allowing each of said plurality of objects to be plugged into said system.

3. A system as claimed in claim 2 wherein said user interface is configured to display said hierarchical organization of properties for a selected one of the objects in a tree.

4. A system as claimed in claim 3 wherein said tree comprises a series of nodes corresponding to each said class, said family and said property set of said selected object.

5. A system as claimed in claim 4 wherein said launch means is a button for each of said nodes.

6. A system as claimed in claim 5 wherein said inspector is a window for displaying a setting of the properties.

7. A system as claimed in claim 6 wherein said setting is initialized at an ambient value.

8. A system as claimed in claim 6 wherein said inspector has three modes for launching of an additional inspector.

9. A system as claimed in claim 8 wherein said three modes comprise a recycle mode for replacing a dialog box of said inspector with contents of said additional inspector, a follow mode for opening a new dialog box and for copy common attributes of said inspector and said addtional inspector, and a lock mode for opening a new dialog box and for displaying said setting of properties of said additional inspector.

10. A system as claimed in claim 6 wherein said inspector includes preset means for saving and retieving said setting of properties of the selected one object.

11. A system as claimed in claim 10 wherein said inspector has means for sizing an object and a switch for toggling between a crop mode and an uncropped mode therefor, said uncropped mode for preserving said setting of attributes of said selected object at end points thereof, and said crop mode for manipulating said setting settings of attributes of said selected object to stay in synchronization with other objects.

12. A system as claimed in claim 6 wherein said inspector includes an animation control mechanism for setting and unsetting keys of an animatable property set.

13. A system as claimed in claim 12 wherein said animation control mechanism includes means for triggering said system to move to at least one of a next key of said animatable property said and a previous key of said animatable property set.

14. A user interface for rendering an electronic image, comprising:
input means for defining the electronic image with at least one object the at least one object having hierarchical organization of properties each defining a display attribute of the object, the hierarchical organization comprising at least one property set, each said property set comprising a family of properties, each said family comprising at least one class of properties; and
a launcher responsive to said input means for launching an inspector, said inspector being configured to at least one of display and modify one of the properties associated with the at least one object.

15. A user interface as claimed in claim 14 wherein said input means includes a plurality of buttons each being associated with a respective one of the objects, each said object comprising a plug-in object and being included in said hierarchical organization.

16. A user interface as claimed in claim 15 wherein said launcher is configured to display said hierarchical organization of properties in a tree.

17. A user interface as claimed in claim 16 wherein said tree includes a series of nodes corresponding to each said class, said family and said property set of a selected one of the objects.

18. A user interface as claimed in claim 17 wherein said launcher is a button associated with each of said nodes.

19. A user interface as claimed in claim 18 wherein said inspector includes a window for displaying a setting of the properties.

20. A user interface as claimed in claim 19 wherein said inspector is representative of one of the families of one of the property sets and has a selectable tabbed page display for one of the classes of the one family.

21. A user interface as claimed in claim 20 wherein said setting is initialized at an ambient value.

22. A user interface as claimed in claim 21 wherein said inspector has a menu for selecting one of tree modes for launching of an additional inspector.

23. A system as claimed in claim 22 wherein said three modes comprise a recycle mode for replacing a dialog box of said inspector with contents of said additional inspector, a follow mode for opening a new dialog box and for copying common attributes of said inspector and said additional inspector, and a lock mode for opening a new dialog box and for displaying said setting of properties of said additional inspector.

24. A user interface as claimed in claim 19 wherein said inspector includes preset means for saving and retrieving said setting of properties of the selected one object.

25. A user into as claimed in claim 24 wherein said preset means for retrieving said settings is a thumbnail bitmap.

26. A user interface as claimed in claim 25 wherein said inspector includes a page of thumbnail bitmaps, each said thumbnail bitmap being associated with one of the settings of properties of a selected one of the families.

27. A user interface as claimed in claim 19 wherein said inspector has an animation control switch for setting and unsetting keys of an animatable property set of said selected object.

28. A user interface as claimed in claim 27 wherein said animation control switch includes means for triggering the user interface to move to at least one of a next key of said animatable property said and a previous key of said animatable property set.

29. A user interface as claimed in claim 19 wherein said inspector has a switch for toggling between a crop mode and an uncropped mode for sizing an object, said uncropped mode for preserving said setting of attributes of said selected object at end points thereof and said crop mode for manipulating said setting of attributes of said selected object to stay in synchronization with other objects.

30. A method for adapting an object for a plug-in environment comprising
providing a hierarchical organization of attributes characterizing said object,
displaying said hierarchical organization of attributes in a tree structure having a series of nodes corresponding to a family, a class within the family, and a property set of said object,
launching an inspector for displaying a setting of attributes of said object,
and modifying said setting of attributes.

31. A method as claimed in claim 30 wherein said inspector is representative of a family of a property set and has a selectable tabbed page display for each said class of attributes of said family.

32. A method as claimed in claim 31 wherein said setting is intialized at an ambient value.

33. A method as claimed in claim 32 wherein said inspector has a menu for selecting one of three modes for launching of an additional inspector.

34. A method as claimed in claim 33 wherein said three modes comprise a recycle mode for replacing a dialog box of said inspector with contents of said additional inspector, a follow mode for opening a new dialog box and for copying common attributes of said inspector and said additional inspector, and a lock mode for opening a new dialog box and for displaying said setting of properties of said additional inspector.

35. A method as claimed it claim 34 wherein said inspector includes preset means for saving and retrieving said setting of properties of the selected one object.

36. A method as claimed in claim 35 wherein said preset means for retrieving said settings is a thumbnail bitmap.

37. A method as claimed in claim 36 wherein said inspector includes a page of thumbnail bitmaps, each said thumbnail bitmap being associated with one of the settings of properties of a selected one of the families.

38. A method as claimed in claim 37 wherein said inspector has an animation control switch for setting and unsetting keys of an animatable property set of said selected object.

39. A method as claimed in claim 38 wherein said animation control switch includes means for triggering a user interface to move to at least one of a next key of said animatable property said and a previous key of said animatable property set.

40. A method as claimed in claim 39 wherein said inspector has a switch for toggling between a crop mode and an uncropped mode for sizing an object, said uncropped mode for preserving said setting of attributes of said selected object at end points thereof and said crop mode for mampulating said setting of attributes of said selected object to stay in synchronization with other objects.

* * * * *